United States Patent
Tsuchihashi et al.

(10) Patent No.: US 12,269,640 B2
(45) Date of Patent: Apr. 8, 2025

(54) STICKER AFFIXING SYSTEM, METHOD TO BE EXECUTED BY STICKER AFFIXING SYSTEM, AND NON-TRANSITORY COMPUTER-READABLE MEDIUM STORING PROGRAM TO BE EXECUTED BY STICKER AFFIXING SYSTEM

(71) Applicant: OMRON Corporation, Kyoto (JP)

(72) Inventors: Yuki Tsuchihashi, Kyoto (JP); Hiromi Sasaki, Kyoto (JP); Yoko Yoshida, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 201 days.

(21) Appl. No.: 18/091,677

(22) Filed: Dec. 30, 2022

(65) Prior Publication Data

US 2023/0234744 A1    Jul. 27, 2023

(30) Foreign Application Priority Data

Jan. 21, 2022    (JP) ................................ 2022-008069

(51) Int. Cl.
     *B25J 9/16*      (2006.01)
     *B25J 15/06*      (2006.01)
     (Continued)

(52) U.S. Cl.
     CPC ............. *B65C 9/40* (2013.01); *B25J 9/1612* (2013.01); *B25J 9/163* (2013.01); *B25J 9/1633* (2013.01);
     (Continued)

(58) Field of Classification Search
     CPC .......... B65C 9/40; B65C 9/1884; B65C 9/42; B65C 9/0015; B65C 9/08; B65C 9/26;
     (Continued)

(56) References Cited

U.S. PATENT DOCUMENTS 4,657,622 A * 4/1987 Paules ...................... B65C 9/02
                                                                                     156/DIG. 27
4,711,687 A * 12/1987 Paules ...................... B65C 9/02
                                                                                      156/DIG. 27

(Continued)

FOREIGN PATENT DOCUMENTS

CN      109573233 A      4/2019
JP      2003-081232 A      3/2003

(Continued)

OTHER PUBLICATIONS

Extended European Search Report dated Jun. 6, 2023 in European Application No. 22217042.5.

(Continued)

*Primary Examiner* — Harry Y Oh
(74) *Attorney, Agent, or Firm* — Sughrue Mion, PLLC

(57) ABSTRACT

Teaching including adjustment of an inclination of a suction tool with respect to an object is performed in teaching of a suction position of the suction tool. A sticker affixing system includes an articulated robot, a controller, a suction tool attached to a distal end of the articulated robot, a force sensor, and a storage. The controller causes the articulated robot to execute an operation of bringing the suction tool close to a sticker on a release paper in a teaching mode, an operation of adjusting a suction position of the suction tool and an inclination in a traveling direction (roll axis X) of the suction tool in peeling off the sticker based on a signal from the force sensor, and an operation of storing the teaching data including information about the adjusted suction position and the inclination of the suction tool in the storage.

15 Claims, 15 Drawing Sheets

(51) Int. Cl.
*B65C 9/18* (2006.01)
*B65C 9/40* (2006.01)

(52) U.S. Cl.
CPC ......... *B65C 9/1884* (2013.01); *B25J 15/0616* (2013.01)

(58) Field of Classification Search
CPC ........ B25J 9/1612; B25J 9/163; B25J 9/1633; B25J 15/0616; G05B 2219/49136
See application file for complete search history.

(56) References Cited

U.S. PATENT DOCUMENTS

| | | | | |
|---|---|---|---|---|
| 6,378,588 | B1* | 4/2002 | Nixon | B65C 9/08 156/227 |
| 11,104,468 | B1* | 8/2021 | Tomasetta | B25J 11/0075 |
| 2003/0041973 | A1* | 3/2003 | Soto | B65C 9/1869 156/566 |
| 2004/0123564 | A1* | 7/2004 | McErlean | B65B 61/20 53/445 |
| 2006/0249240 | A1* | 11/2006 | Dijkstra | B65C 9/1884 156/64 |
| 2016/0159511 | A1* | 6/2016 | Hyca | B65C 1/021 156/387 |
| 2017/0008171 | A1 | 1/2017 | Iwatake | |
| 2017/0014995 | A1* | 1/2017 | Kato | B25J 9/1633 |
| 2017/0217622 | A1* | 8/2017 | Wolff | B65C 1/026 |
| 2018/0361576 | A1* | 12/2018 | Sakai | B25J 9/1694 |
| 2022/0033127 | A1* | 2/2022 | O'Callaghan | B65C 9/40 |
| 2022/0188530 | A1* | 6/2022 | Ikawa | G06K 7/10366 |
| 2022/0315370 | A1* | 10/2022 | Capitani | B65C 9/28 |

FOREIGN PATENT DOCUMENTS

| | | |
|---|---|---|
| JP | 2009-286429 A | 12/2009 |
| JP | 2012-197095 A | 10/2012 |
| JP | 2012-232826 A | 11/2012 |
| JP | 2020-114743 A | 7/2020 |
| JP | 2021-028242 A | 2/2021 |
| JP | 2021-122923 A | 8/2021 |

OTHER PUBLICATIONS

Tian et al., "Modeling and control of robotic automatic polishing for curved surfaces", CIRP Journal of Manufacturing Science and Technology, 2016, vol. 14, pp. 55-64 (10 pages total).

* cited by examiner

FIG.11
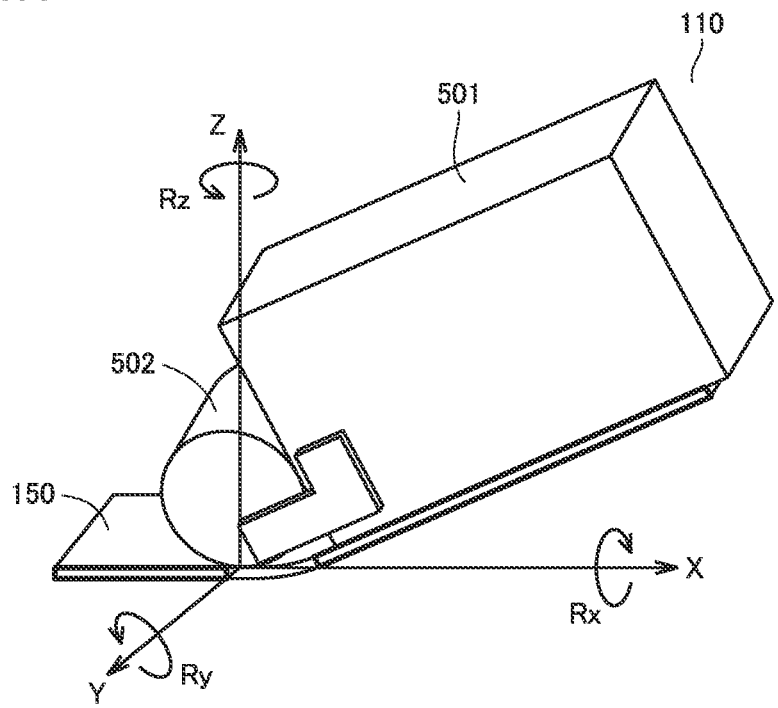
NO-CONTROL OF Rx AXIS
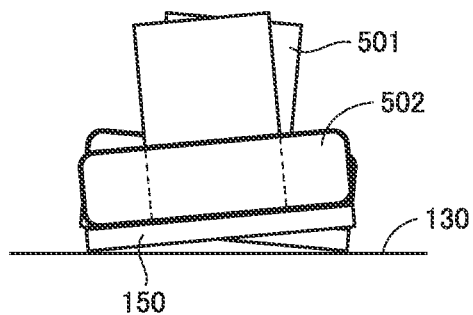
CONTROL OF Rx AXIS
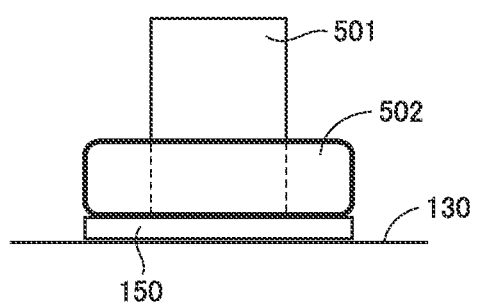
NO-CONTROL OF Z-AXIS
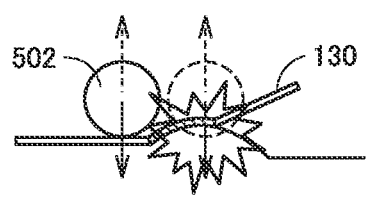
CONTROL OF Z-AXIS
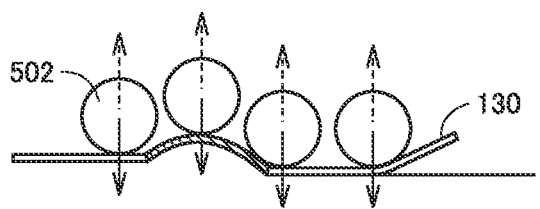

STICKER AFFIXING SYSTEM, METHOD TO BE EXECUTED BY STICKER AFFIXING SYSTEM, AND NON-TRANSITORY COMPUTER-READABLE MEDIUM STORING PROGRAM TO BE EXECUTED BY STICKER AFFIXING SYSTEM

BACKGROUND OF THE INVENTION

Field of the Invention

The present disclosure relates to a sticker affixing system, and more specifically, to a sticker affixing system using an articulated robot.

Description of the Background Art

When a sticker is peeled off from a release paper on a sticker feeder using a suction tool or the like to affix the sticker to an object, sometimes a warpage, a wrinkle, or the like is generated in the sticker. Sometimes the sticker is not appropriately affixed to the object due to such the warpage, the wrinkle, or the like of the sticker. For this reason, there is a need for a system peeling off the sticker without deforming the sticker to appropriately affix the sticker to the object, or a technique for supporting or improving at least a part of each process peeling off the sticker without deforming the sticker and appropriately affixing the sticker to the object.

Regarding a sticker peeling and affixing technique, for example, Japanese Patent Laying-Open No. 2021-028242 discloses a label affixing device "including: sticker feeding means that feeds the labels along a predetermined direction while peeling a plurality of labels affixed to a mount from the release paper; a stage including a flat placement surface on which the label fed by the sticker feeding means are placed; and a robot arm that grips a label L placed on the stage and affixes the label to a container main body, in which the stage is disposed at a predetermined interval from the placement surface and includes a pressing member including an abutment portion that prevents the warpage of the label by abutting on the label fed by the label feeding means" (see [Abstract]).

In addition, for example, other techniques related to peeling and sticking of the sticker are disclosed in Japanese Patent Laying-Open No. 2012-197095, Japanese Patent Laying-Open No. 2020-114743, Japanese Patent Laying-Open No. 2009-286429, Japanese Patent Laying-Open No. 2012-232826, Japanese Patent Laying-Open No. 2003-081232, and Japanese Patent Laying-Open No. 2021-122923.

SUMMARY OF THE INVENTION

According to the techniques disclosed in Japanese Patent Laying-Open No. 2021-028242, Japanese Patent Laying-Open No. 2012-197095, Japanese Patent Laying-Open No. 2020-114743, Japanese Patent Laying-Open No. 2009-286429, Japanese Patent Laying-Open No. 2012-232826, Japanese Patent Laying-Open No. 2003-081232, and Japanese Patent Laying-Open No. 2021-122923, teaching including adjustment of an inclination of the suction tool with respect to the object cannot be performed in teaching of a suction position of the suction tool. Accordingly, there is a need for the technique for performing the teaching including the adjustment of the inclination of the suction tool with respect to the object in the teaching of the suction position of the suction tool.

According to an embodiment, a sticker affixing system is provided. A sticker affixing system includes an articulated robot, a controller configure to control the articulated robot, a suction tool attached to a distal end of the articulated robot, a force sensor configured to detect force applied to the suction tool, and a storage configured to store teaching data of the articulated robot. The controller causes the articulated robot to execute: an operation of bringing the suction tool close to a sticker on a release paper in a teaching mode; an operation of adjusting a suction position of the suction tool and an inclination in a traveling direction (roll axis) of the suction tool in peeling off the sticker based on a signal from the force sensor; and an operation of storing the teaching data including information about the adjusted suction position and inclination of the suction tool in the storage.

According to this disclosure, the sticker affixing system can perform the teaching also including the adjustment of the inclination in the traveling direction (roll axis) of the suction tool during the sticker peeling to the articulated robot. As a result, the sticker affixing system can prevent generation of a wrinkle of the sticker during the sticker peeling.

In the above disclosure, the controller: acquires a measured value of moment of the roll axis of the suction tool from the force sensor; calculates a difference between the measured value of the moment of the roll axis and a target value of the moment of the roll axis; and determines an adjustment amount of the inclination in the suction tool on the roll axis based on the difference.

According to this disclosure, the sticker affixing system can adjust the inclination in the roll axis of the suction tool based on the difference between the measured value of the moment of the roll axis and the target value of the moment of the roll axis.

In the above disclosure, the controller further causes the articulated robot to execute an operation of adjusting an inclination of a pitch axis with respect to a traveling direction of the suction tool based on the signal from the force sensor.

According to this disclosure, the sticker affixing system can perform the teaching also including the adjustment of the inclination in the pitch axis with respect to the traveling direction of the suction tool during the sticker peeling to the articulated robot. As a result, the sticker affixing system can prevent generation of a wrinkle of the sticker during the sticker peeling.

In the above disclosure, the controller: acquires a measured value of moment of the pitch axis of the suction tool from the force sensor; calculates a difference between the measured value of the moment of the pitch axis and a target value of the moment of the pitch axis; and determines an adjustment amount of the inclination in the suction tool on the pitch axis based on the difference.

According to this disclosure, the sticker affixing system can adjust the inclination in the pitch axis of the suction tool based on the difference between the measured value of the moment of the pitch axis and the target value of the moment of the pitch axis.

In the above disclosure, the controller stores a position separated from the adjusted suction position by a predetermined distance above the release paper in the storage as a start position of a sticker peeling operation in the suction tool.

According to this disclosure, the sticker affixing system can determine a start position of the sticker peeling operation in the suction tool based on the adjusted suction position.

According to another embodiment, a method for controlling a sticker affixing system is provided. A sticker affixing system includes an articulated robot, a controller configure to control the articulated robot, a suction tool attached to a distal end of the articulated robot, a force sensor configured to detect force applied to the suction tool, and a storage configured to store teaching data of the articulated robot. The method includes: bringing the suction tool close to a sticker on a release paper in a teaching mode; adjusting a suction position of the suction tool and an inclination in a traveling direction (roll axis) of the suction tool in peeling off the sticker based on a signal from the force sensor; and storing the teaching data including information about the adjusted suction position and the inclination on the roll axis in the storage.

According to this disclosure, the sticker affixing system can execute the method to cause the articulated robot to perform the teaching including the adjustment of the inclination in the traveling direction (roll axis) of the suction tool during the sticker peeling. As a result, the sticker affixing system can prevent generation of a wrinkle of the sticker during the sticker peeling.

Furthermore, according to another embodiment, a program for controlling a sticker affixing system is provided. A sticker affixing system includes an articulated robot, a controller configure to control the articulated robot, a suction tool attached to a distal end of the articulated robot, a force sensor configured to detect force applied to the suction tool, and a storage configured to store teaching data of the articulated robot. The program causes the sticker affixing system to perform: bringing the suction tool close to a sticker on a release paper in a teaching mode; adjusting a suction position of the suction tool and an inclination in a traveling direction (roll axis) of the suction tool in peeling off the sticker based on a signal from the force sensor; and storing the teaching data including information about the adjusted suction position and the inclination on the roll axis in the storage.

According to this disclosure, the sticker affixing system can execute the program to cause the articulated robot to perform the teaching including the adjustment of the inclination in the traveling direction (roll axis) of the suction tool during the sticker peeling. As a result, the sticker affixing system can prevent generation of a wrinkle of the sticker during the sticker peeling.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 11 is a view illustrating an example of control in a traveling direction and posture control of the suction tool 110 during affixing processing.

DESCRIPTION OF THE PREFERRED EMBODIMENT

Figure 1:
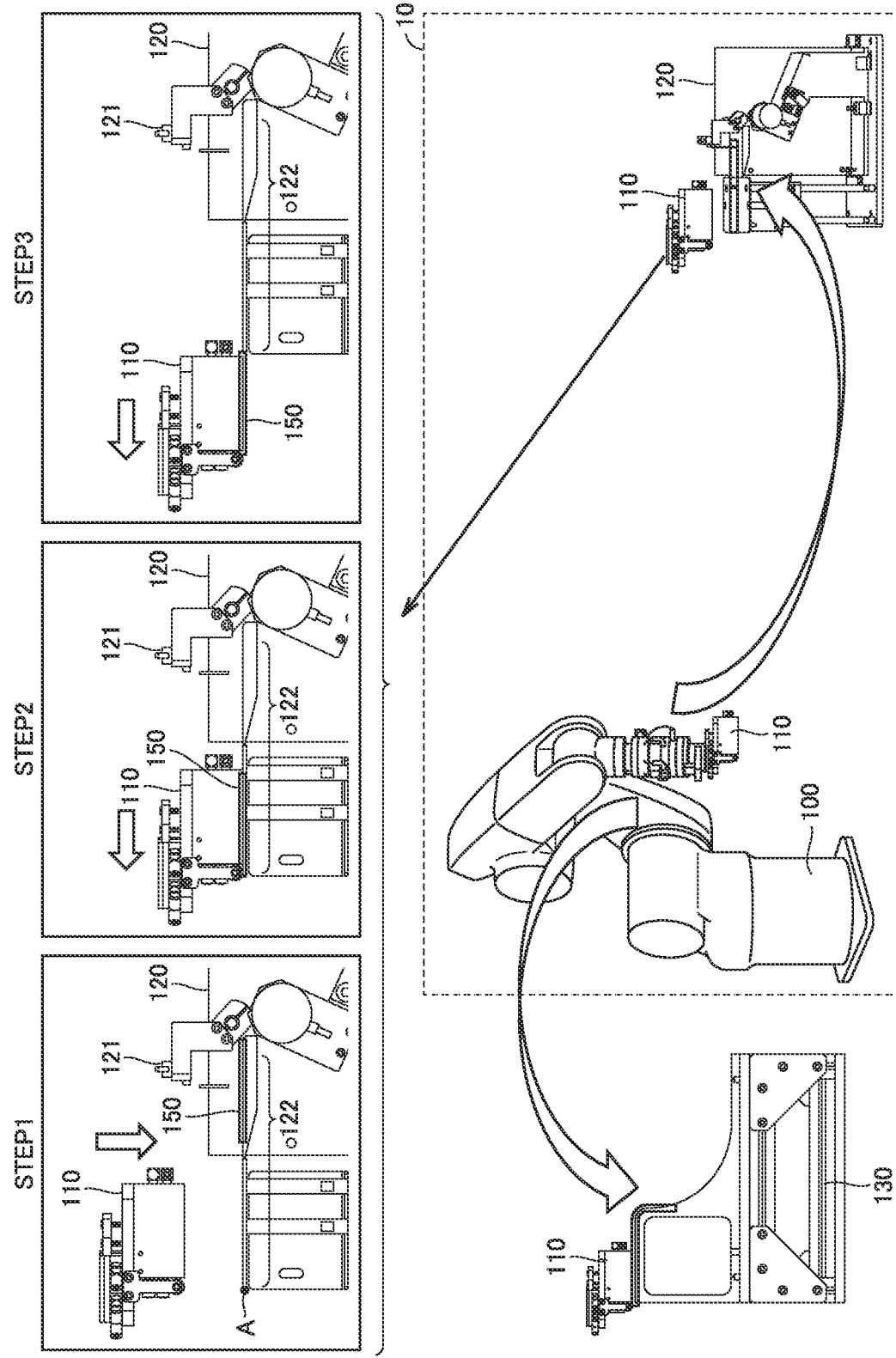
FIG. 1 is a view illustrating an example of a whole image and an operation outline of a sticker affixing system 10 according to an embodiment.

Hereinafter, an embodiment of the technical idea according to the present disclosure will be described with reference to the drawings. In the following description, the same component is denoted by the same reference numeral. Those names and functions are the same. Accordingly, the detailed description thereof will not be repeated.

A. Configuration of Sticker Affixing System

First, with reference to FIGS. 1 to 6, an operation example and a hardware configuration of a sticker affixing system to which the technique disclosed in the present specification can be applied will be described. In the present specification, the term "system" includes a configuration including one or a plurality of devices, and a service, a virtual machine, an instance, a container, and the like constructed on a cloud environment. Furthermore, the system includes a configuration including one or a plurality of devices, and a combination of a service, a virtual machine, an instance, a container, and the like constructed on the cloud environment and various devices such as an articulated robot and a sticker feeder. In the present specification, the term "sticker (or seal)" includes a label, a tape, a film, and the like affixed to another object. Furthermore, the sticker may include a sticker affixed to an object with an adhesive and a sticker affixed to an object using vacuum, such as a film for liquid crystal protection of a smartphone.

FIG. 1 is a view illustrating an example of a whole image and an operation outline of a sticker affixing system 10 according to an embodiment. With reference to FIG. 1, a configuration of sticker affixing system 10 and a series of operations in which sticker affixing system 10 peels a sticker 150 from a release paper 300 (see FIG. 3) to affix sticker 150 to an object will be described. At the same time, a mechanism for sticker affixing system 10 preventing generation of wrinkles of sticker 150 in peeling processing of sticker 150 will also be described.

Sticker affixing system 10 mainly includes an articulated robot 100, a suction tool 110, and a sticker feeder 120. Articulated robot 100, suction tool 110, and sticker feeder 120 are controlled by a controller 200 (see FIG. 2).

Articulated robot 100 is configured to be able to attach a tool suitable for the application to a distal end of own device. In the example of FIG. 1, suction tool 110 is attached to articulated robot 100. Articulated robot 100 may also be a vertical articulated robot, a horizontal articulated robot, or any other robot. Furthermore, articulated robot 100 may include any number of joints, and may be a six-axis articulated robot as an example.

Figure 5:
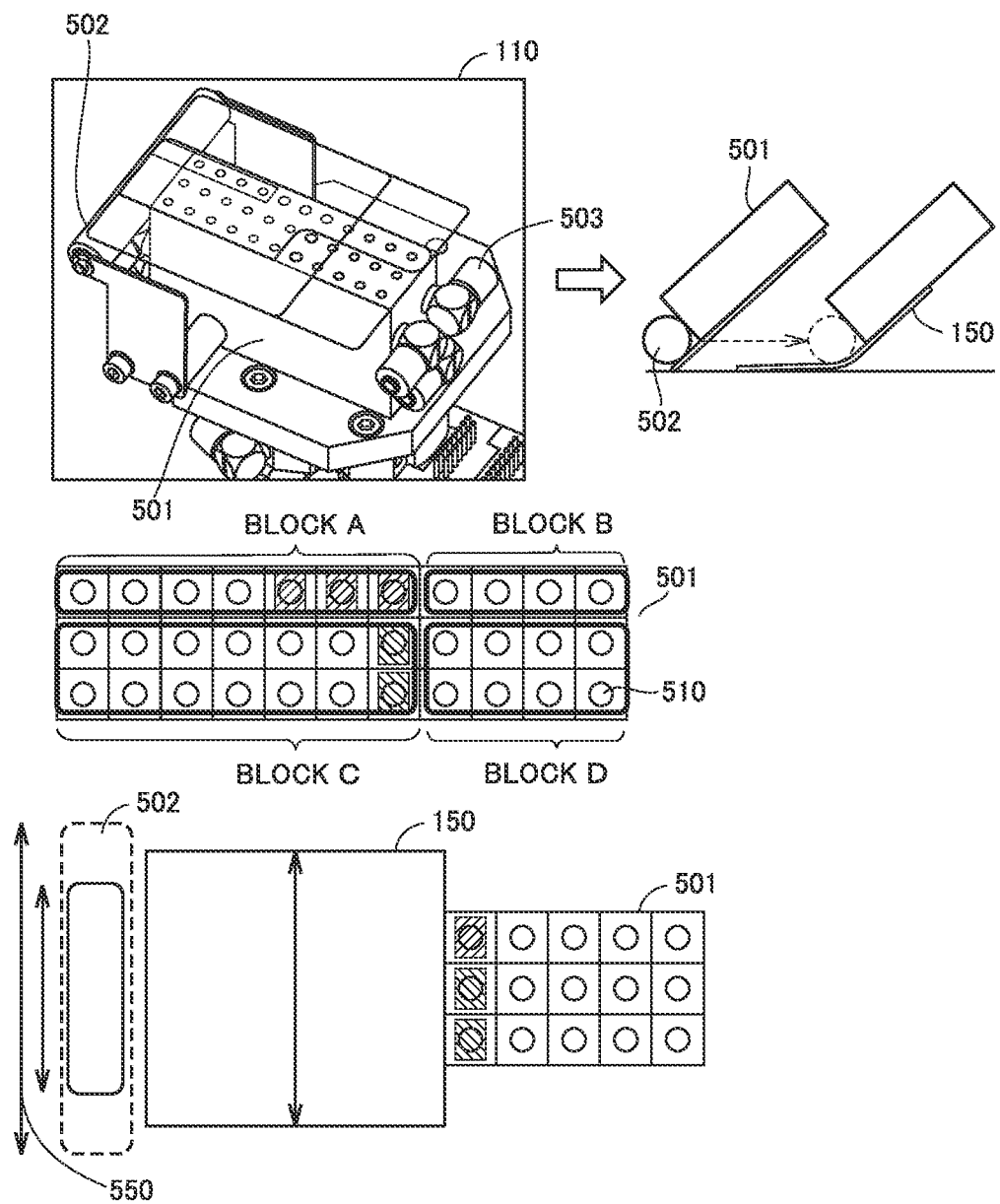
FIG. 5 is a view illustrating an example of a configuration of a suction tool 110.

Suction tool 110 includes a plurality of holes for suction to sticker 150. The tool connected to the distal end of articulated robot 100 such as suction tool 110 is also called an end effector. Suction tool 110 is connected to at least one vacuum generator 204 (also called a vacuum ejector) (see FIG. 2). With reference to FIG. 5, details of suction tool 110 will be described.

Figure 2:
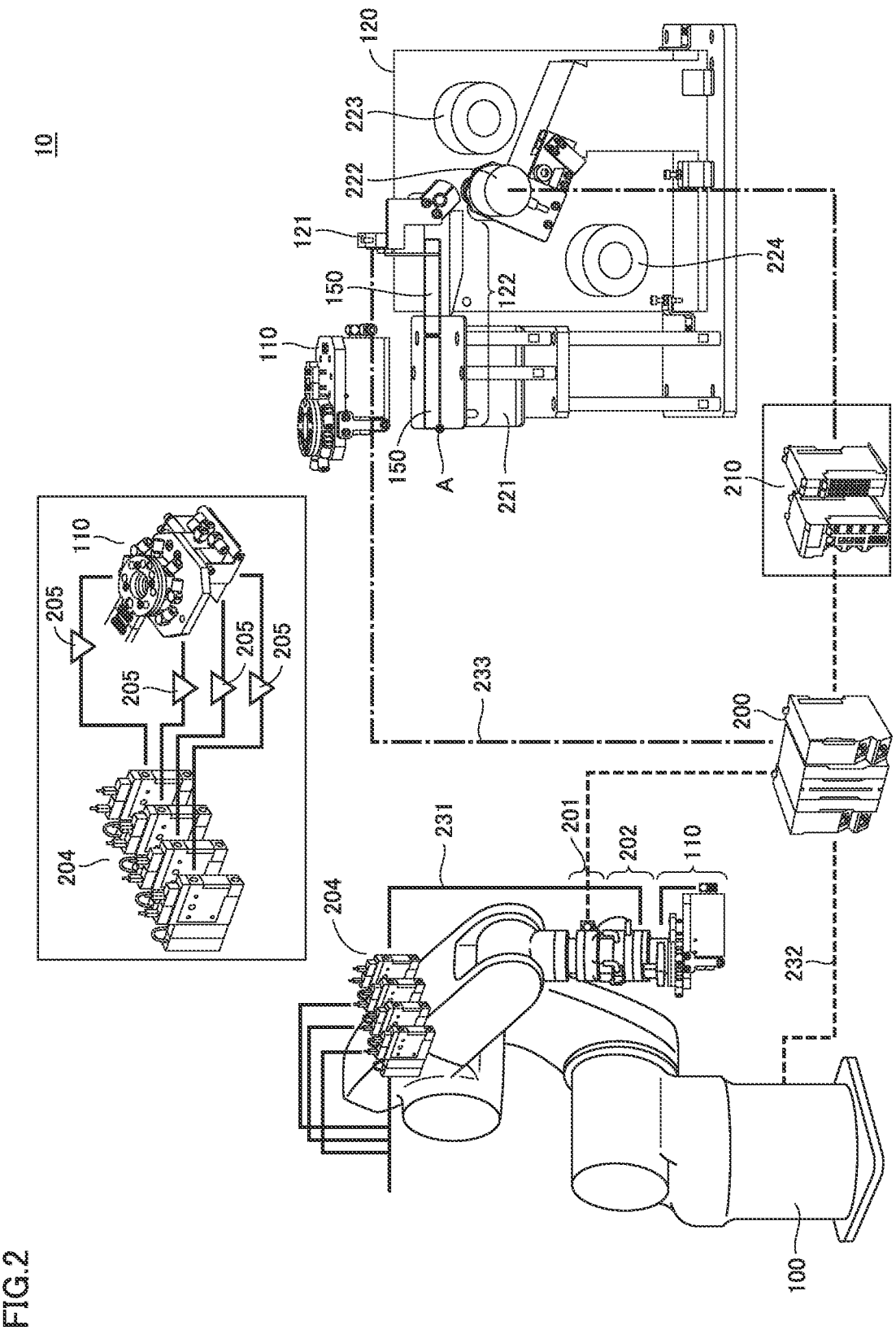
FIG. 2 is a view illustrating an example of a hardware configuration of the sticker affixing system 10.

Sticker feeder 120 conveys one side of a roll of release paper 300 from a first winding shaft 223 (see FIG. 2) toward a second winding shaft 224 (see FIG. 2). Sticker 150 is peeled off from release paper 300 at an edge A of a peeling base 122 while release paper 300 is conveyed from first winding shaft 223 toward second winding shaft 224. Sticker feeder 120 includes a sensor 121. Sensor 121 may detect that sticker 150 passes directly under sensor 121. Sensor 121 may also be referred to as a latch sensor. In one aspect, sensor 121 may be a photoelectric sensor.

An object 130 is an object to which sticker 150 is affixed. A surface of object 130 to which sticker 150 is affixed is not necessarily a flat surface. In one aspect, the surface of object 130 to which sticker 150 is affixed may be a flat surface, a curved surface, a portion of a corner, or a combination of all of these.

The operation of sticker affixing system 10 will be described below.

In step 1, articulated robot 100 moves suction tool 110 to a suction start position (or a standby position) in a vicinity of peeling base 122. Furthermore, sticker feeder 120 conveys release paper 300, and conveys a signal acquired from sensor 121 or position information about sticker 150 to controller 200.

In step 2, articulated robot 100 lowers suction tool 110 based on an instruction from controller 200 to suck suction tool 110 to sticker 150. Furthermore, articulated robot 100 moves suction tool 110 in parallel with release paper 300 such that the speed of suction tool 110 becomes a constant with respect to a conveyance speed of release paper 300. That is, articulated robot 100 moves suction tool 110 in parallel with release paper 300 in synchronization with movement of sticker feeder 120. Thus, suction tool 110 is carried to edge A of peeling base 122 together with sticker 150 while sucked to sticker 150.

In step 3, articulated robot 100 continues the parallel movement with respect to release paper 300 until passing through edge A of peeling base 122. Release paper 300 is bent at edge A of peeling base 122 and wound around second winding shaft 224. Sticker 150 moves in parallel from edge A of peeling base 122 while being sucked to suction tool 110. As a result, sticker 150 is peeled off from release paper 300.

As described above, suction tool 110 moves in parallel with release paper 300 in synchronization with the movement of release paper 300 while being sucked to sticker 150. That is, sticker 150 is conveyed on peeling base 122 while sandwiched between suction tool 110 and release paper 300 without warping and/or wrinkling. Then, at edge A of peeling base 122, sticker 150 continues to move in parallel while maintaining a shape by suction tool 110, and release paper 300 is bent and wound around second winding shaft 224. The series of procedures described above allows sticker affixing system 10 to peel sticker 150 off from release paper 300 without warping and/or wrinkling sticker 150.

In step 3 and subsequent steps, articulated robot 100 affixes sticker 150 to object 130, moves suction tool 110 to the suction start position, and repeatedly executes the above processing. With reference to FIGS. 10 to 14, details of the affixing operation of sticker 150 will be described later.

FIG. 2 is a view illustrating an example of a hardware configuration of sticker affixing system 10. With reference to FIG. 2, the hardware configuration of sticker affixing system 10 will be described. In addition to articulated robot 100, suction tool 110, and sticker feeder 120, sticker affixing system 10 includes controller 200, a force sensor 201, a tool changer 202, at least one vacuum generator 204, and an encoder signal converter 210.

Vacuum generator 204, tool changer 202, and suction tool 110 are connected to each other through an air pipe 231. A flow rate regulator 205 is provided for each path (air pipe 231) between each vacuum generator 204 and suction tool 110. Controller 200 is connected to force sensor 201 and articulated robot 100 through a first signal line 232. In one aspect, first signal line 232 may be EtherCAT (registered trademark) or any type of signal line. Sticker feeder 120 is connected to controller 200 and encoder signal converter 210 through a second signal line 233. In one aspect, second signal line 233 may be any type of signal line.

Controller 200 controls articulated robot 100, flow rate regulator 205 (or vacuum generator 204), and sticker feeder 120. In one aspect, controller 200 may be a programmable logic controller (PLC). In another aspect, controller 200 may be an integrated controller including the PLC and a robot controller. Controller 200 has the following functions related to the technique of the present disclosure.

As a first function, controller 200 transmits the instruction including a movement destination of suction tool 110 to articulated robot 100. Articulated robot 100 generates the posture of articulated robot 100 based on the received instruction (based on the movement destination of suction tool 110), and operates based on the generated posture (moves suction tool 110 to a target location). The movement destination of suction tool 110 also includes the posture of suction tool 110 (an angle of each of an XYZ-axes in a space). As another example, controller 200 may transmit the instruction including the posture of articulated robot 100 to articulated robot 100. In this case, articulated robot 100 operates to take the posture included in the received instruction.

As a second function, controller 200 drives sticker feeder 120. More specifically, controller 200 transmits a drive permission signal to sticker feeder 120. A controller (not illustrated) of sticker feeder 120 drives a motor 222 mounted on sticker feeder 120 directly or through a motor driver or the like (not illustrated) based on the reception of the drive permission signal. Motor 222 directly or indirectly rotates first winding shaft 223 and second winding shaft 224. Release paper 300 is conveyed from first winding shaft 223 to second winding shaft 224 by the power of motor 222.

As a third function, controller 200 synchronizes the movements of articulated robot 100 and sticker feeder 120.

First, controller 200 acquires information calculating the position of sticker 150 to be removed next from sticker feeder 120 through encoder signal converter 210. More specifically, sticker feeder 120 includes an encoder 720 (see FIG. 7) for calculating a conveyance amount of release paper 300. Encoder 720 is provided at an arbitrary position on sticker feeder 120 where rotation of first winding shaft 223, second winding shaft 224, the shaft of motor 222, a pulley on the path of release paper 300, or the like can be detected. Controller 200 receives the signal of sensor 121 (indicating timing at which sticker 150 peeled off next passes below sensor 121) and the signal of encoder 720 (conveyance amount of release paper 300) from sticker feeder 120 as the information calculating the position of sticker 150 peeled off next.

Controller 200 calculates or records the timing at which sticker 150 peeled off next passes through a reference position (immediately below sensor 121) from the signal of sensor 121. In addition, controller 200 calculates a distance by which sticker 150 peeled off next moves after passing the reference position (immediately below sensor 121) (the current position of sticker 150 peeled off next) from the signal of encoder 720. Controller 200 controls articulated robot 100 in accordance with the current position of sticker 150 peeled off next. That is, controller 200 calculates the movement destination and the movement speed of suction tool 110 from the signal of sensor 121 and the signal of encoder 720. Articulated robot 100 moves suction tool 110 to a position where sticker 150 peeled off next is located based on the instruction from controller 200. In addition, articulated robot 100 moves suction tool 110 to the standby position for peeling off sticker 150 after affixing sticker 150 to object 130. Controller 200 determines operation timing of suction tool 110 (the timing of suction to sticker 150) based on the timing at which sensor 121 detects sticker 150 and the output of encoder 720. Controller 200 transmits a command to articulated robot 100 to move suction tool 110 from the standby position to the suction position of next sticker 150 at the determined operation timing.

In one aspect, controller 200 may control articulated robot 100 and sticker feeder 120 such that suction tool 110 is sucked to sticker 150 peeled off next while release paper 300 is not moved. In another aspect, in the state where release paper 300 is conveyed, controller 200 may control articulated robot 100 and sticker feeder 120 such that suction tool 110 is sucked to sticker 150 peeled off next while following release paper 300.

After suction tool 110 is sucked to sticker 150 peeled off next, controller 200 controls articulated robot 100 based on the signal of encoder 720 such that suction tool 110 moves in parallel at a constant speed (such that suction tool 110 moves in synchronization with sticker feeder 120) with respect to sticker 150 (or release paper 300) peeled off next.

As a fourth function, controller 200 controls suction force of suction tool 110. More specifically, controller 200 adjusts or turns on/off an amount of air sucked by each vacuum generator 204 by each flow rate regulator 205. In this manner, for example, controller 200 can increase the suction force of suction tool 110 when sticker 150 is peeled off, and decrease the suction force of suction tool 110 when sticker 150 is affixed.

Figure 9:
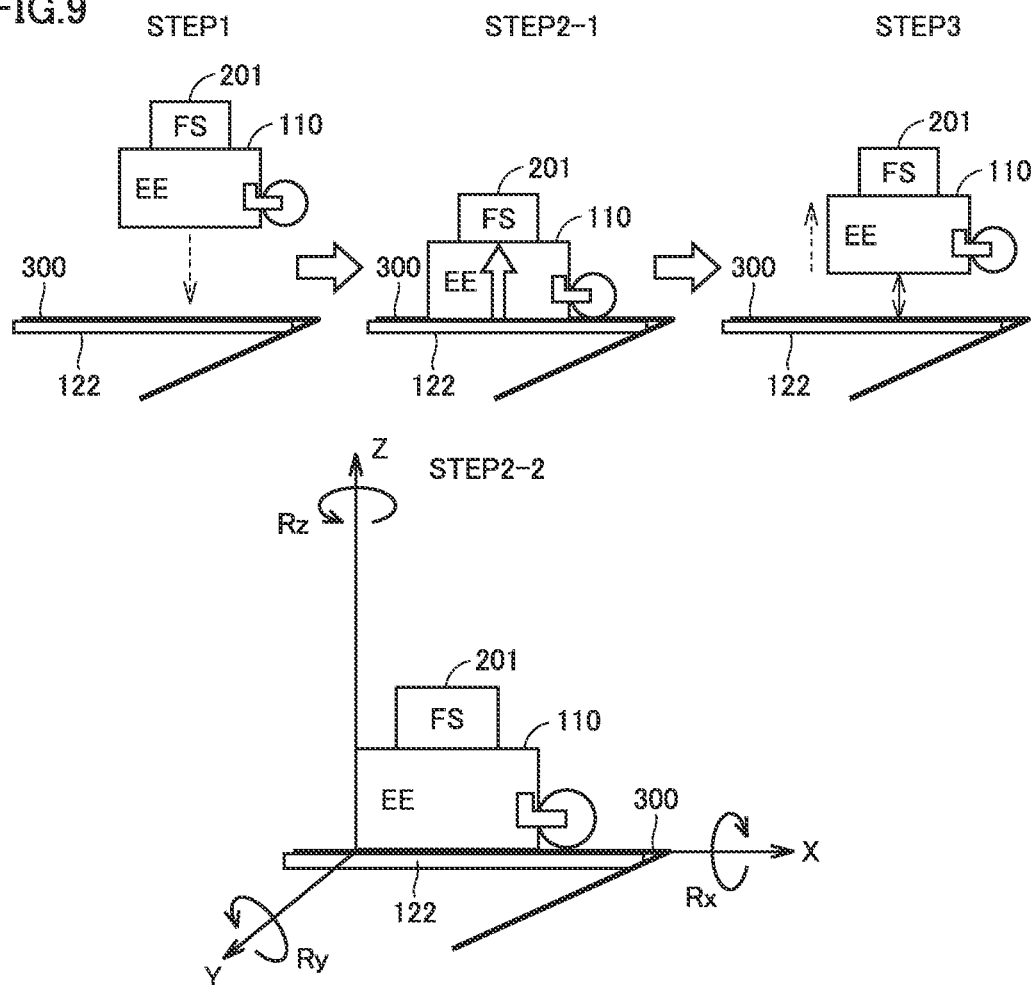
FIG. 9 is a view illustrating an example of a procedure for teaching the peeling processing of the sticker 150 in the sticker affixing system 10.

As an example, force sensor 201 is installed between the distal end of articulated robot 100 and tool changer 202. Force sensor 201 measures force generated in suction tool 110 (actually, force generated in force sensor 201), and outputs the signal indicating the force generated in suction tool 110 to controller 200. Force sensor 201 detects force in a three-dimensional direction (X-axis, Y-axis, Z-axis) generated in the suction tool and moment in a rotation direction (Rx, Ry, Rz) with respect to each axis. The moment is force applied in the rotational direction with respect to the axis, and is also referred to as a moment load or moment of force. The signal output from force sensor 201 is used for teaching the peeling operation of sticker 150 by articulated robot 100, posture control of suction tool 110 at the time of affixing sticker 150, and the like. With reference to FIG. 9, the teaching of the peeling operation of sticker 150 will be described later. With reference to FIGS. 10 to 14, the posture control of suction tool 110 at the time of affixing sticker 150 will be described later.

Tool changer 202 is configured to be able to attach various tools to articulated robot 100. In the example of FIG. 2, tool changer 202 is used to attach suction tool 110 to articulated robot 100. Furthermore, tool changer 202 may be a transit point in order to connect vacuum generator 204 and suction tool 110 using air pipe 231.

Vacuum generator 204 is connected to an external compressor or the like. Vacuum generator 204 internally throttles and discharges the compressed air. When the compressed air is discharged at a high speed, the internal pressure decreases. As a result, vacuum generator 204 sucks air from the hole of suction tool 110 through air pipe 231. In one aspect, vacuum generator 204 may be attached to articulated robot 100 or disposed at a position different from articulated robot 100.

Encoder signal converter 210 has a function of acquiring the signal of encoder 720 to transmit the signal to controller 200. In one aspect, encoder signal converter 210 may be separate from controller 200 or integrated with controller 200. In another aspect, encoder signal converter 210 may be incorporated in sticker feeder 120 or disposed outside sticker feeder 120. In still another aspect, encoder signal converter 210 may have a function of transmitting the signal of sensor 121 to controller 200. Alternatively, controller 200 may directly receive the signal of sensor 121 through second signal line 233.

Sticker feeder 120 includes motor 222, first winding shaft 223, second winding shaft 224, and an extension base 221. Motor 222 directly or indirectly rotates first winding shaft 223 and/or second winding shaft 224 to convey release paper 300 from first winding shaft 223 to second winding shaft 224. Extension base 221 extends the distance of which release paper 300 is sent in the horizontal direction with respect to the ground (distance of peeling base 122). A length in the horizontal direction (the conveyance direction of the release paper 300) of peeling base 122 is configured to be greater than or equal to a length in the horizontal direction (a direction indicated by an arrow 310 in FIG. 3) of suction tool 110.

Figure 3:
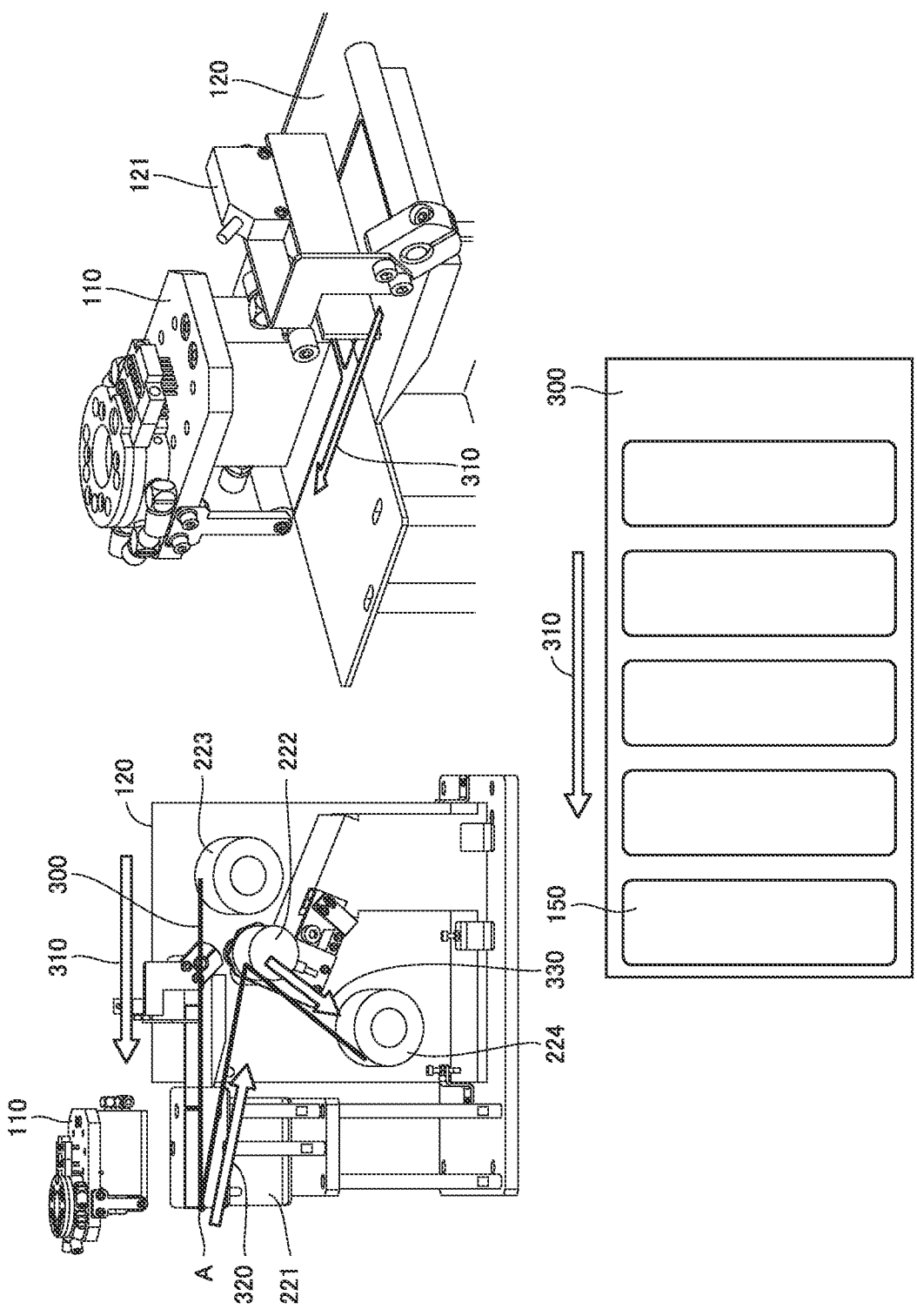
FIG. 3 is a view illustrating an example of an appearance of a sticker feeder 120.

FIG. 3 is a view illustrating an example of an appearance of sticker feeder 120. With reference to FIG. 3, the operation of sticker feeder 120 and how sticker 150 is peeled off from release paper 300 will be described in detail.

Stickers 150 are affixed to release paper 300 at equal intervals, and release paper 300 itself is a roll. The roll of release paper 300 is attached to first winding shaft 223, and one end of release paper 300 is attached to second winding shaft 224.

When motor 222 of sticker feeder 120 is driven, release paper 300 is conveyed from first winding shaft 223 to second winding shaft 224. At this point, for example, release paper 300 reaches second winding shaft 224 from first winding shaft 223 through a path indicated by arrows 310, 320, 330.

For example, a roller conveying release paper 300 may be disposed between the paths of arrow 320 and arrow 330.

Release paper 300 passes under sensor 121 when passing through the path (horizontal direction with respect to the ground) of arrow 310. Sensor 121 transmits the signal of sensor 121 to controller 200. Controller 200 refers to the signal of sensor 121 and records the timing at which sticker 150 passes through the reference position (such as immediately below sensor 121). Sticker feeder 120 or encoder signal converter 210 transmits the signal of encoder 720 to controller 200. Controller 200 can calculate the current position (that is, how far sticker 150 moves from the reference position) of sticker 150 and the conveying speed with reference to the signal of encoder 720. Controller 200 uses information about the current position and/or the conveyance speed of sticker 150 for synchronous processing (processing for moving suction tool 110 at a constant speed in parallel with release paper 300).

After passing under sensor 121, release paper 300 is carried on peeling base 122. On peeling base 122, one of stickers 150 on release paper 300 is sucked (held) by suction tool 110. While suction tool 110 is stuck to sticker 150, release paper 300 is conveyed to edge A of peeling base 122. At this point, suction tool 110 advances in the direction of arrow 310 at a constant speed with respect to release paper 300.

When reaching edge A of peeling base 122, release paper 300 is folded back in the direction of arrow 320. On the other hand, sticker 150 sucked (held) by suction tool 110 is conveyed by suction tool 110 in the direction of arrow 310 even after reaching edge A of peeling base 122. That is, sticker 150 is peeled off from release paper 300 at edge A. At this point, sticker 150 is sucked by suction tool 110, and peeled off from release paper 300 while maintaining the shape.

Figure 4:
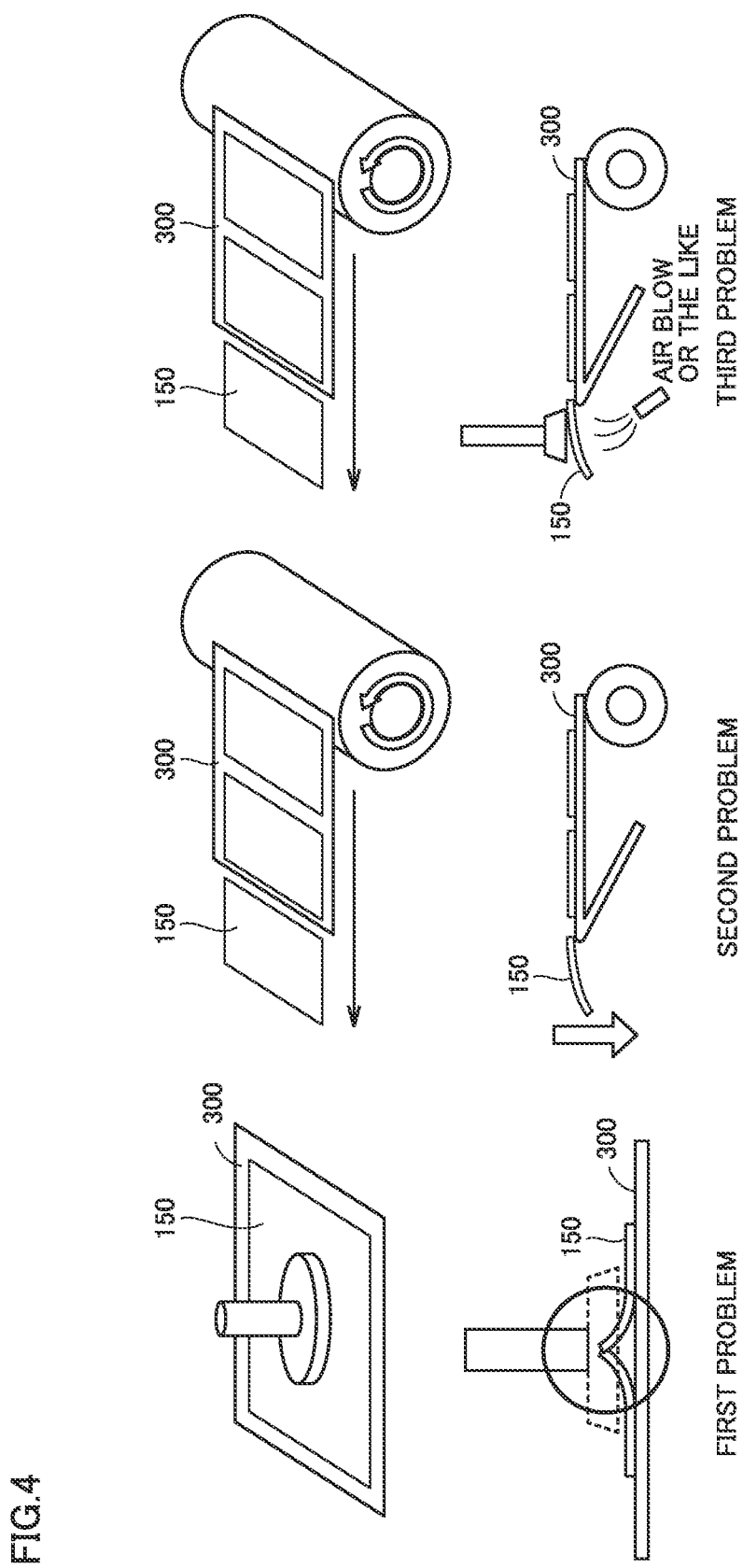
FIG. 4 is a view illustrating an example of various problems that may be generated when a sticker 150 is peeled off from a release paper 300.

FIG. 4 is a view illustrating an example of various problems that may be generated when sticker 150 is peeled off from release paper 300. With reference to FIG. 4, various problems that may be generated when sticker 150 is peeled off from release paper 300 will be described. As will be described later with reference to FIG. 5, suction tool 110 of the embodiment includes a configuration solving these problems.

As a first problem, when sticker 150 is peeled off from release paper 300 by the suction tool having one hole, suction wrinkles may be generated on the surface of sticker 150. This may be generated when a part of the surface of sticker 150 is sucked with strong force. For this reason, desirably the suction tool that sucks to a wide surface of sticker 150 with equal force is used so as not to generate the suction wrinkle on the surface of sticker 150.

As a second problem, at the time of peeling off from release paper 300, sticker 150 may sag due to an influence of gravity or warp due to an influence of a curling habit of the roll of sticker 150. For this reason, prevention of sag and warpage of sticker 150 is required at the time of peeling-off from release paper 300.

As a third problem, when external force such as air blow is used to prevent the sag and the warpage of sticker 150, the external force itself may become disturbance and interfere with picking of sticker 150 by suction tool 110. Accordingly, desirably the sag and the warpage of sticker 150 are prevented without no use of the external force.

FIG. 5 is a view illustrating an example of the configuration of suction tool 110. With reference to FIG. 5, the configuration and the function of suction tool 110 will be described. Suction tool 110 includes a suction portion 501, a pressing portion 502, and at least one intake port 503.

Suction portion 501 includes a plurality of holes 510 on a surface thereof. The plurality of holes 510 constitute at least one block. In the example of FIG. 5, suction portion 501 includes blocks A, B, C, D. Hole 510 included in each block is connected to each intake port 503. Hole 510 included in each blocks is connected to any one of vacuum generators 204 through intake port 503 and air pipe 231. In the example of FIG. 5, blocks A, B, C, D correspond to individual vacuum generators 204.

Controller 200 adjusts the suction force of suction tool 110 in units of blocks. Thus, suction tool 110 can also be sucked to sticker 150 using some blocks (for example, only blocks A, C) according to the shape of sticker 150. Suction tool 110 can also be sucked to large sticker 150 using all the blocks.

Suction portion 501 includes the plurality of holes 510, so that suction portion 501 can be uniformly sucked to the wide surface of sticker 150. Suction portion 501 can prevent the generation of the suction wrinkle on sticker 150 by uniformly sucking to the wide surface of sticker 150. In addition, because suction portion 501 does not require the external force during the peeling-off of sticker 150, suction portion 501 is not affected by disturbance. Suction tool 110 keeps moving horizontally beyond edge A of sticker feeder 120 while being sucked to sticker 150, thereby preventing sticker 150 from the sag or the warpage.

In one aspect, some or all of holes 510 may be configured to be closed as necessary. For example, some or all of holes 510 may be threaded holes. In this case, each hole 510 can be closed with a hexagon socket set screw or the like. As another example, some or all of holes 510 may be configured to be closed by a cap or the like. Suction portion 501 is configured to close individual holes 510, the user can finely adjust the suction force of suction tool 110.

Pressing portion 502 is used when sticker 150 is affixed to object 130. Articulated robot 100 moves suction tool 110 along the surface of object 130 while a bottom (surface having hole 510) of suction tool 110 is inclined with respect to the surface of object 130 based on the instruction received from controller 200. Thus, sticker 150 held by suction portion 501 is affixed to the surface of object 130 by pressing portion 502.

In one aspect, pressing portion 502 may include a rotatable roller. In this case, while suction tool 110 moves along the surface of object 130, the roller of pressing portion 502 presses sticker 150 against the surface of object 130 while rotating. In another aspect, pressing portion 502 may include a spatula or a corner. In this case, while suction tool 110 moves along the surface of object 130, pressing portion 502 presses sticker 150 against the surface of object 130 by the spatula or the corner of the spatula.

In another aspect, pressing portion 502 may be configured to be detachable by replacing a plurality of types of suction tools 110. The length in the direction indicated by an arrow 550 (the direction perpendicular to the affixing direction of sticker 150) is desirably exchangeable according to the size of sticker 150. Pressing portion 502 is configured to be detachable from suction tool 110, so that a user can select pressing portion 502 having an appropriate length with respect to sticker 150 from among the plurality of types of pressing portions 502 and attach selected pressing portion 502 to suction tool 110.

In another aspect, controller 200 may adjust the suction force of suction portion 501 in affixing sticker 150 to object 130 such that the suction force of suction portion 501 is weaker than the suction force of suction portion 501 in peeling off sticker 150 from release paper 300. With this adjustment, pressing portion 502 can easily peel off sticker 150 from suction portion 501 and stick sticker 150 to object 130. As an example, by stopping or adjusting inflow of the air into at least a part of the plurality of vacuum generators 204, controller 200 may adjust the suction force of suction portion 501 in affixing sticker 150 to object 130 such that the suction force of suction portion 501 is weaker than the suction force of suction portion 501 in peeling off sticker 150 from release paper 300.

Intake port 503 is connected to vacuum generator 204 through air pipe 231. As pressure in vacuum generator 204 decreases, the outside air sucked from hole 510 is sent to vacuum generator 204 through intake port 503. As a result, sticker 150 is attracted to hole 510.

Figure 6:
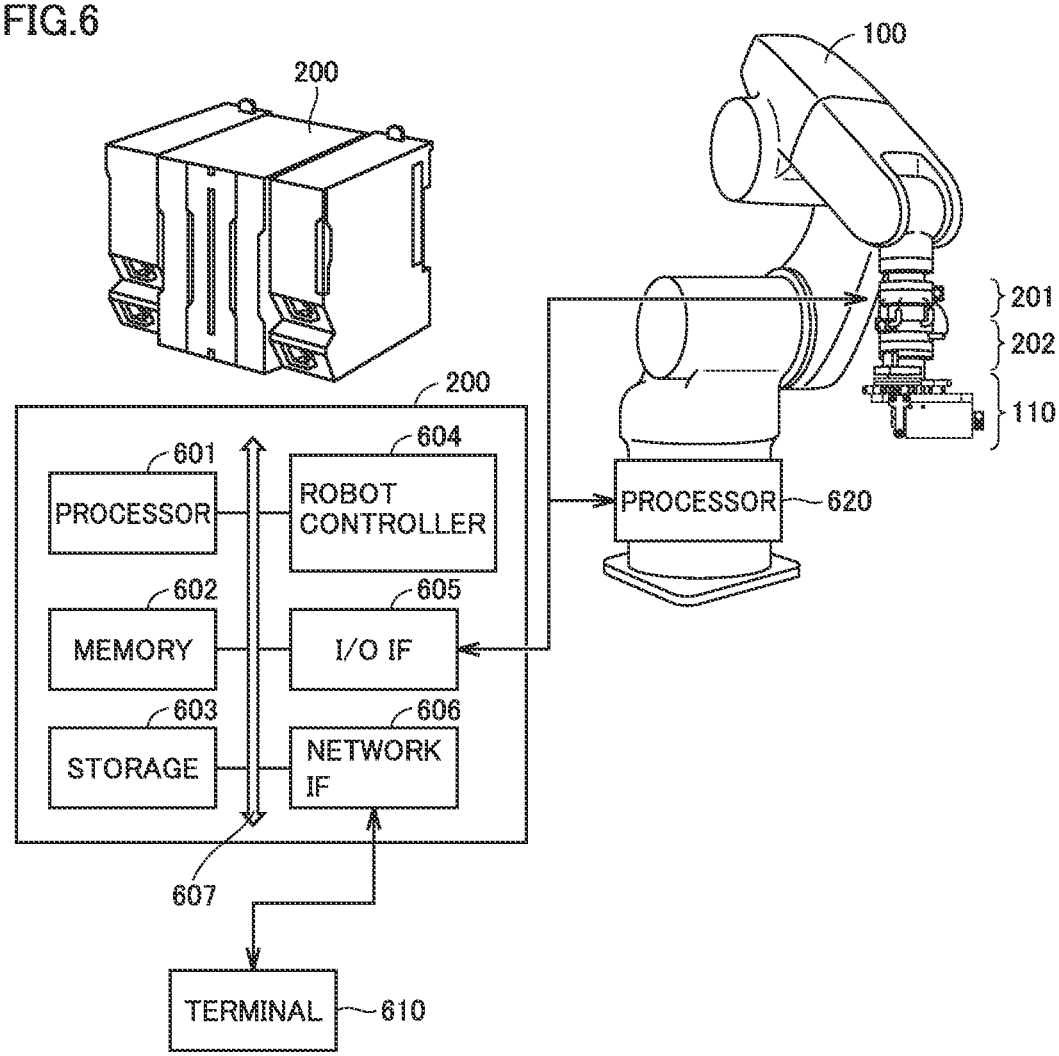
FIG. 6 is a view illustrating an example of a circuit configuration of a controller 200.

FIG. 6 is a view illustrating an example of a circuit configuration of controller 200. With reference to FIG. 6, the circuit configuration of controller 200 will be described. Controller 200 includes a processor 601, a memory 602, a storage 603, a robot controller 604, an input output (I/O) interface (IF) 605, a network IF 606, and a bus 607.

Processor 601 executes the program expanded in memory 602 and refers to the data expanded in memory 602, whereby processor 601 can implement various functions of controller 200. In one aspect, processor 601 can implement the function as the PLC by executing the program. In another aspect, processor 601 can implement all or a part of the functions related to the control of articulated robot 100 by executing the program. For example, processor 601 is constructed with at least one integrated circuit. For example, the integrated circuit may include at least one central processing unit (CPU), at least one field programmable gate array (FPGA), or a combination thereof.

Memory 602 stores the program executed by processor 601 and data referred to by processor 601. In one aspect, memory 602 may be implemented by a dynamic random access memory (DRAM), a static random access memory (SRAM), or the like.

Storage 603 is a nonvolatile memory, and may store the program executed by processor 601 and the data referred to by processor 601. In this case, processor 601 executes the program read from storage 603 to memory 602, and refers to the data read from storage 603 to memory 602. In one aspect, storage 603 may be implemented by a hard disk drive (HDD), a solid state drive (SSD), an erasable programmable read only memory (EPROM), an electrically erasable programmable read only memory (EEPROM), a flash memory, or the like.

Robot controller 604 controls articulated robot 100. As an example, robot controller 604 may generate the instruction transmitted to articulated robot 100, and transmit the instruction to articulated robot 100 through I/O IF 605.

For example, robot controller 604 is constructed with at least one integrated circuit. For example, the integrated circuit may be constructed of at least one CPU, at least one application specific integrated circuit (ASIC), a combination thereof, or the like. In one aspect, processor 601 may have the function of robot controller 604. In another aspect, robot controller 604 may be prepared separately from processor 601.

Articulated robot 100 comprises a processor 620, and processor 620 executes the received command. In one aspect, articulated robot 100 may include the integrated circuit implemented by FPGA, ASIC, or the like instead of processor 620.

I/O IF 605 is a communication interface with another device. Controller 200 may include at least one I/O IF 605. In addition, I/O IF 605 may include a plurality of interfaces corresponding to different protocols. For example, I/O IF 605 may include an interface corresponding to the communication protocol of first signal line 232 and an interface corresponding to the communication protocol of second signal line 233. I/O IF 605 can be connected to articulated robot 100, force sensor 201, encoder signal converter 210, sensor 121, flow rate regulator 205, and other arbitrary configurations.

Network IF 606 is connected to a wired or wireless network device. For example, controller 200 may be connected to a terminal 610 of the user through network IF 606. In this case, controller 200 can receive the program of the PLC, the program of articulated robot 100, and the like from terminal 610. In one aspect, controller 200 may be connected to terminal 610 through I/O IF 605. In one aspect, network IF 606 may be implemented by a wired local area network (LAN) port, a wireless fidelity (Wi-Fi (registered trademark)) module, or the like. In another aspect, network IF 606 may transmit and receive the data using a communication protocol such as transmission control protocol/internet protocol (TCP/IP) or user datagram protocol (UDP).

Bus 607 mutually connects processor 601, memory 602, storage 603, robot controller 604, I/O IF 605, and network IF 606.

B. Operation of Peeling Off Sticker

Figure 7:
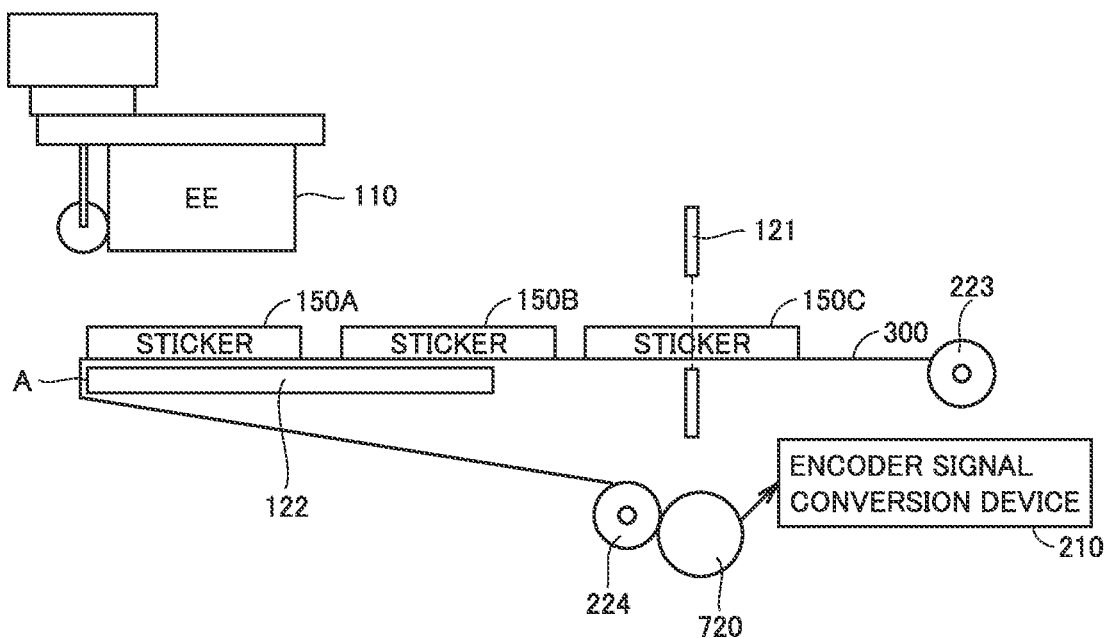
FIG. 7 is a view illustrating an example of a configuration related to peeling processing of the sticker 150 in the sticker affixing system 10.
Figure 8:
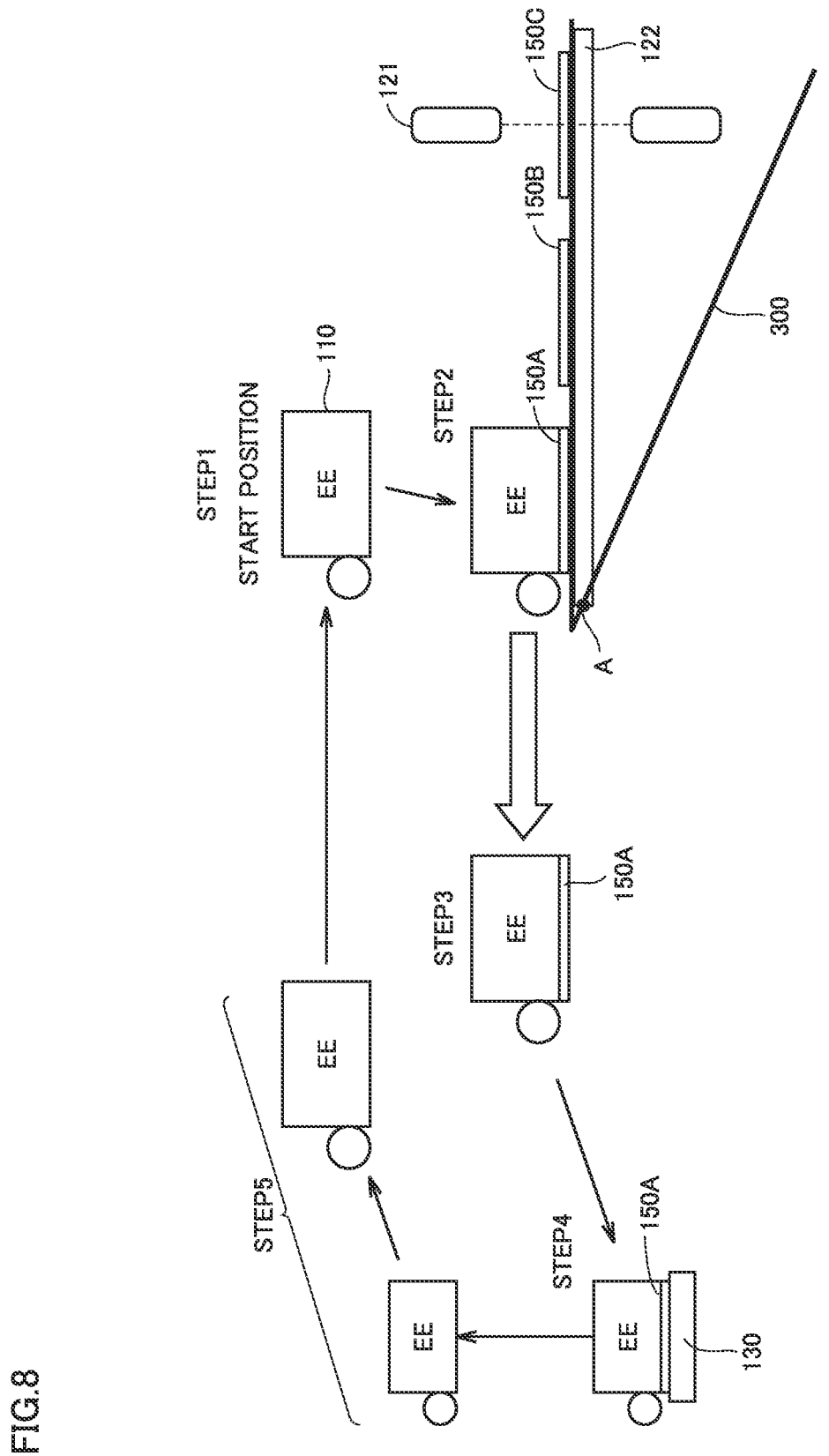
FIG. 8 is a view illustrating an example of a procedure for repeating a peeling operation of the sticker 150 in the sticker affixing system 10.

With reference to FIGS. 7 to 9, a procedure of an operation in which sticker affixing system 10 peels off sticker 150 and a teaching method thereof will be described below.

FIG. 7 is a view illustrating an example of a configuration related to the peeling processing of sticker 150 in sticker affixing system 10. Release paper 300 is conveyed from first winding shaft 223 to second winding shaft 224 through edge A of peeling base 122. Sticker 150 (in the example of FIG. 7, stickers 150A, 150B, 150C) is uniformly stuck on release paper 300. Encoder signal converter 210 transmits the signal of encoder 720 to controller 200. In one aspect, encoder signal converter 210 may acquire the signal of sensor 121 and transmit the signal to controller 200.

FIG. 8 is a view illustrating an example of a procedure for repeating an operation of peeling off sticker 150 in sticker affixing system 10. With reference to FIG. 8, the procedure for repeating the operation of peeling off sticker 150 will be described using stickers 150A, 150B, 150C as an example.

In a first step, sticker affixing system 10 moves the suction tool (EE: end effector) 110 to a start position of the peeling processing using articulated robot 100. Furthermore, sticker affixing system 10 moves sticker 150A to the suction position using sticker feeder 120.

In a second step, sticker affixing system 10 causes suction tool 110 to be sucked to sticker 150A conveyed to the suction position of release paper 300. In one aspect, sticker affixing system 10 may cause suction tool 110 to be sucked to sticker 150A while the conveyance of release paper 300 by sticker feeder 120 is stopped. In another aspect, sticker affixing system 10 may cause suction tool 110 to be sucked to sticker 150A while release paper 300 is conveyed by sticker feeder 120. In this case, suction tool 110 includes not only the lowering operation but also the operation of following sticker 150A in the horizontal direction as the operation during the suction.

In a third step, sticker affixing system 10 moves suction tool 110 in parallel at a constant speed of release paper 300 while suction tool 110 is sucked to sticker 150A. Sticker 150A is peeled off from release paper 300 at the time of exceeding edge A of peeling base 122. Release paper 300 is folded back at edge A and wound around second winding shaft 224.

In a fourth step, sticker affixing system 10 affixes sticker 150A to object 130. As illustrated in FIG. 5, the affixing processing is performed while suction tool 110 is inclined with respect to the surface of object 130.

In a fifth step, sticker affixing system 10 returns suction tool 110 to the start position. In one aspect, sticker affixing system 10 may move sticker 150B (sticker 150 peeled off next) to the suction position by sticker feeder 120 between the third step and the fifth step. In another aspect, sticker affixing system 10 may move sticker 150B (sticker 150 peeled off next) to the suction position by sticker feeder 120 after suction tool 110 returns to the start position of the peeling processing. Hereinafter, sticker affixing system 10 affixes stickers 150B, 150C to object 130 in a similar procedure. Each of stickers 150A, 150B, 150C is affixed to different object 130 (for example, objects 130A, 130B, 130C).

FIG. 9 is a view illustrating an example of a procedure for teaching the peeling processing of sticker 150 in sticker affixing system 10. Sometimes articulated robot 100 may previously require teaching of positioning in processing for picking a workpiece or the like. In addition, when a soft object such as sticker 150 is picked, sometimes articulated robot 100 may require more precise teaching. With reference to FIG. 9, a teaching procedure of processing in which articulated robot 100 picks (sucks and peels) sticker 150 using suction tool 110 will be described. In the example of FIG. 9, force sensor 201 is positioned on suction tool 110, but tool changer 202 may exist between force sensor 201 and suction tool 110.

The X-axis is a traveling direction of release paper 300 and suction tool 110, and the Y-axis is a direction perpendicular to the X-axis on the surface of peeling base 122. The Z-axis is a direction upward perpendicular to the X-axis. Rx is a rotation direction with respect to the X-axis, Ry is a rotation direction with respect to the Y-axis, and Rz is a rotation direction with respect to the Z-axis. The X-axis, the Y-axis, and the Z-axis are also referred to as a roll axis, a pitch axis, and a yaw axis, respectively.

For example, the processing of the following steps 1 to 3 can be executed when the user inputs a start command of the teaching processing to controller 200. First, the user manually brings suction tool 110 close to sticker 150 affixed to release paper 300 on peeling base 122. The user inputs the start command of the teaching processing to sticker affixing system 10 through terminal 610 or the like while suction tool 110 is brought close to sticker 150 to some extent. Sticker affixing system 10 (controller 200) executes the processing of steps 1 to 3 based on the reception of the start command of the teaching processing.

In step 1, sticker affixing system 10 gradually lowers suction tool 110.

In step 2, sticker affixing system 10 determines the suction position (the position in the Z-axis direction) of suction tool 110 to sticker 150 and the suction posture of suction tool 110 to sticker 150. Either of the following steps 2-1, 2-2 may be executed first.

First, in step 2-1, sticker affixing system 10 stops the lowering operation of suction tool 110 when force sensor 201 detects the force in the Z-axis direction greater than or equal to a predetermined threshold. The Z-axis is a direction perpendicular to the surface of peeling base 122. The height at which the lowering operation of suction tool 110 is stopped becomes the suction position of suction tool 110 to sticker 150.

Subsequently, in step 2-2, sticker affixing system 10 adjusts the posture of suction tool 110 such that a measured value of the moment in the Rx direction applied to force sensor 201 (suction tool 110) is less than or equal to a first target value, and such that a measured value of the moment in the Ry direction is less than or equal to a second target value.

More specifically, sticker affixing system 10 acquires the measured value of the moment in the Rx direction from force sensor 201. Subsequently, sticker affixing system 10 compares the measured value of the moment in the Rx direction with the first target value. Sticker affixing system 10 determines the adjustment amount of the posture in the Rx direction of suction tool 110 based on the comparison result. Sticker affixing system 10 adjusts the posture in the Rx direction of suction tool 110. Sticker affixing system 10 repeatedly executes the above processing until the measured value of the moment in the Rx direction becomes less than or equal to the first target value.

In addition, sticker affixing system 10 acquires the measured value of the moment in the Ry direction from force sensor 201. Subsequently, sticker affixing system 10 compares the measured value of the moment in the Ry direction with the second target value. Sticker affixing system 10 determines the adjustment amount of the posture in the Ry direction of suction tool 110 based on the comparison result. Sticker affixing system 10 adjusts the posture in the Ry direction of suction tool 110. Sticker affixing system 10 repeatedly executes the above processing until the measured value of the moment in the Ry direction becomes less than or equal to the second target value.

In step 3, sticker affixing system 10 raises suction tool 110 by a predetermined distance after determining the suction position of suction tool 110 to sticker 150 and the suction posture of suction tool 110 to sticker 150. The raised position of suction tool 110 corresponds to the start position in FIG. 8. In one aspect, controller 200 may be configured to be able to receive input of setting of the rising amount of suction tool 110.

As described above, sticker affixing system 10 adjusts the suction position and the suction posture of suction tool 110 by the teaching function such that not only the force in the Z-axis direction applied to force sensor 201 but also the moment in the Rx direction and the moment in the Ry direction are less than or equal to a certain amount. In this way, the bottom surface of suction tool 110 can be uniformly brought into contact with sticker 150 and sucked. As a result, sticker affixing system 10 can prevent the generation of wrinkle of sticker 150 due to the suction.

C. Operation of Affixing Sticker to Object

With reference to FIGS. 10 to 14, details of the operation of affixing sticker 150 will be described below.

Figure 10:
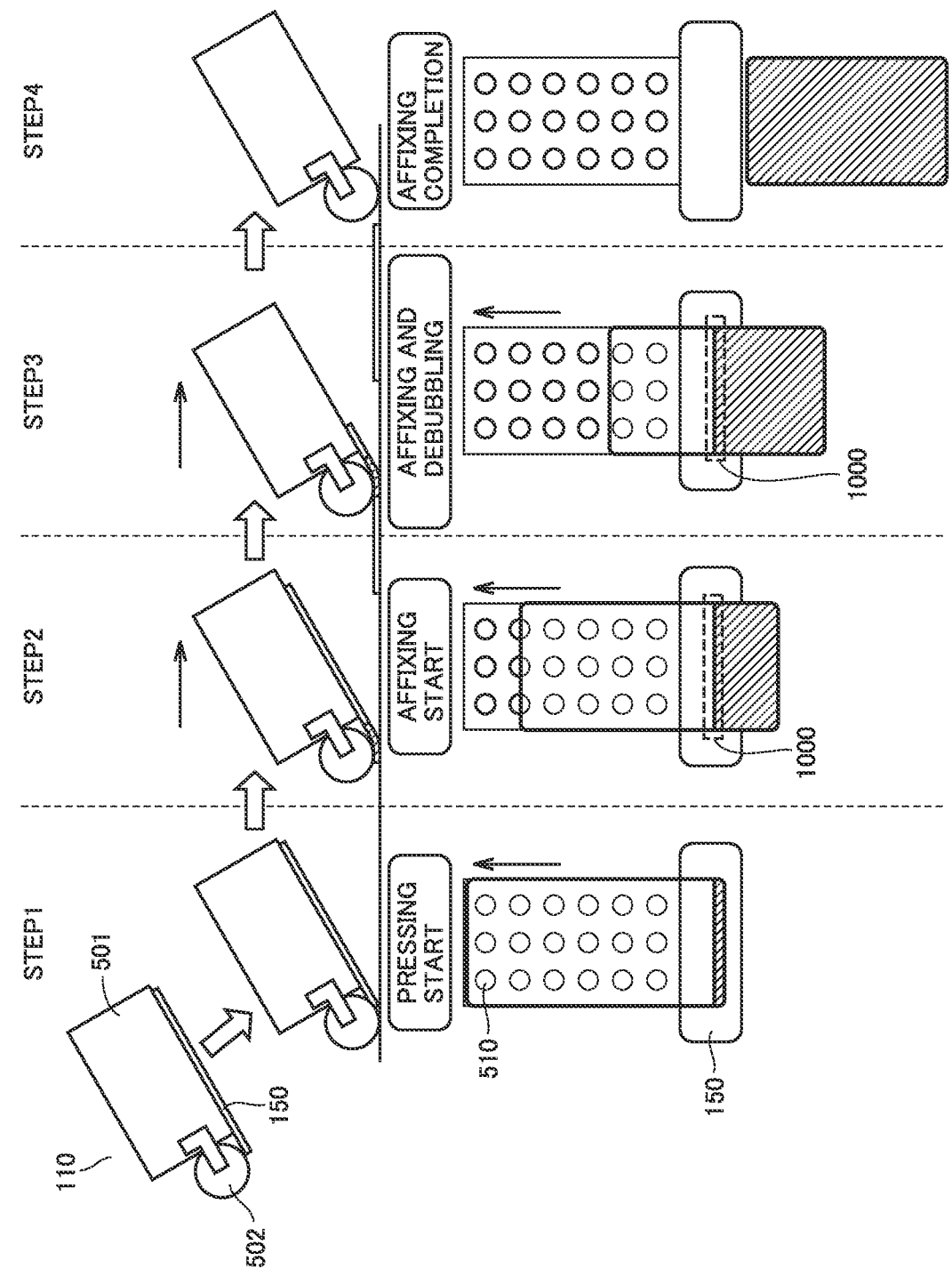
FIG. 10 is a view illustrating an example of an operation for sticking the sticker 150 to an object 130 by the suction tool 110.

FIG. 10 is a view illustrating an example of the operation of affixing sticker 150 to object 130 by suction tool 110. With reference to FIG. 10, the procedure in which sticker affixing system 10 affixes sticker 150 to object 130 without generating a bubble will be described. The following operations from step 1 to step 4 are implemented by controller 200 transmitting the instruction to articulated robot 100 and moving suction tool 110 based on the instruction received by articulated robot 100.

In step 1, suction tool 110 presses sticker 150 against object 130 using pressing portion 502 while the bottom surface of suction portion 501 is inclined with respect to the surface of object 130.

In step 2, suction tool 110 moves along the surface of object 130 while pressing sticker 150 against object 130 using pressing portion 502. When suction tool 110 moves, sticker 150 slides on the surface of the suction portion 501 toward pressing portion 502 because the end is pressed by pressing portion 502.

In step 3, suction tool 110 is further moved along a face of object 130. Suction tool 110 moves while pressing sticker 150 against object 130 using pressing portion 502 having a shape such as a spatula, a corner, or a roller. An area 1000 where only pressing portion 502 presses sticker 150 against object 130 is small, so that the bubble is less likely to be generated during the affixing.

In step 4, suction tool 110 ends the passing over sticker 150 affixed to the face of object 130. Because sticker 150 is pressed by pressing portion 502 with small area 1000 from one end to the other end, the bubble is not generated between sticker 150 and object 130.

In one aspect, controller 200 may adjust the suction force of suction tool 110 in affixing sticker 150 object 130 to be weaker than the suction force of suction tool 110 in peeling off sticker 150. As a result, sticker 150 becomes slippery (easily separated) from suction portion 501.

FIG. 11 is a view illustrating an example of control in the traveling direction and posture control of suction tool 110 during affixing processing. With reference to FIG. 11, the posture control when sticker affixing system 10 affixes sticker 150 to object 130 having a shape other than a flat surface will be described. The operation described with reference to FIG. 11 is implemented by controller 200 transmitting the instruction to articulated robot 100 and adjusting the traveling direction and the posture of suction tool 110 based on the instruction received by articulated robot 100.

The X-axis is the traveling direction of suction tool 110 during the affixing processing, and the Y-axis is the direction perpendicular to the X-axis on the surface of peeling base 122. The Z-axis is a direction upward perpendicular to the X-axis. The X-axis, the Y-axis, and the Z-axis can also be referred to as a roll axis, a pitch axis, and a yaw axis during the affixing processing.

Sticker affixing system 10 detects the force applied in the Z-axis direction of suction tool 110 (or pressing portion 502) and the moment applied in the Rx direction of suction tool 110 (or pressing portion 502) based on the signal acquired from force sensor 201.

Sticker affixing system 10 adjusts the traveling direction of suction tool 110 such that the force applied in the Z-axis direction of suction tool 110 (or the pressing portion 502) becomes constant. More specifically, sticker affixing system 10 compares the measured value of the force applied in the Z-axis direction with the target value of the force applied in the Z-axis direction, and determines the adjustment amount in the traveling direction of suction tool 110. Sticker affixing system 10 changes the traveling direction of suction tool 110 based on the determined adjustment amount. Sticker affixing system 10 repeatedly executes the above processing in the affixing operation.

By keeping the force applied in the Z-axis direction of suction tool 110 (or pressing portion 502) constant, sticker affixing system 10 can always affix sticker 150 to object 130 having a surface other than the flat surface with uniform force.

In addition, controller 200 adjusts the posture of suction tool 110 (inclination in the Rx direction of suction tool 110) such that the moment applied in the Rx direction of suction tool 110 (or pressing portion 502) becomes less than or equal to a target value. More specifically, sticker affixing system 10 compares the measured value of the moment applied in the Rx direction with the target value of the moment applied in the Rx direction, and determines the adjustment amount of the posture (inclination in Rx direction of suction tool 110 or inclination of suction tool 110 with respect to the traveling direction (roll axis (X)) of suction tool 110) of suction tool 110. Sticker affixing system 10 adjusts the posture of suction tool 110 based on the determined adjustment amount. Sticker affixing system 10 repeatedly executes the above processing in the affixing operation.

Sticker affixing system 10 can keep the pressure uniform over the entire contact surfaces of suction portion 501 and sticker 150 by keeping the moment applied in the Rx direction of suction tool 110 (or pressing portion 502) less than or equal to the target value. Thus, sticker affixing system 10 can prevent the generation of the bubble, the wrinkle, and the like due to the affixing operation.

Figure 12:
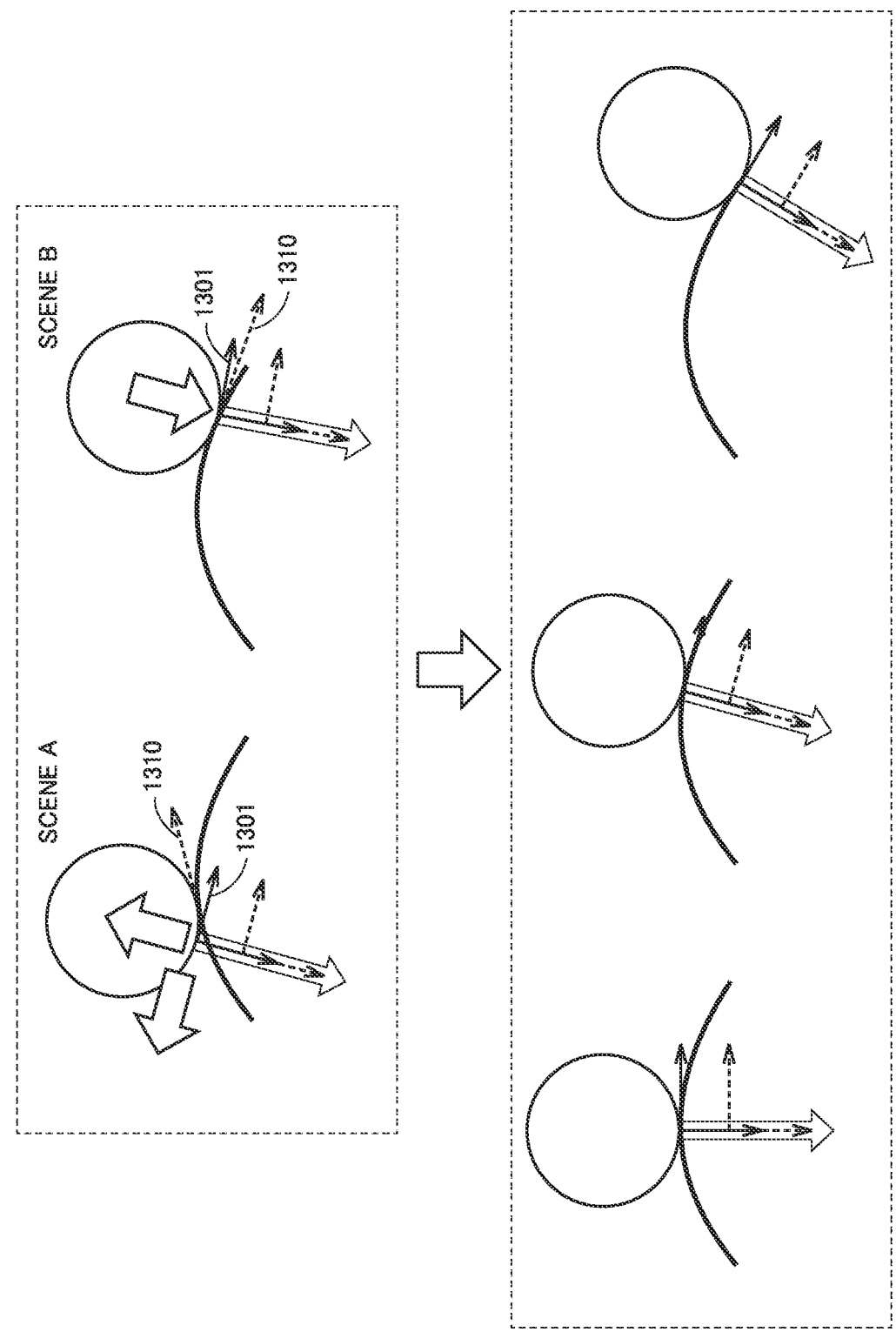
FIG. 12 is a view illustrating an example of the control in the traveling direction of the suction tool 110 with respect to an R-convex surface of the object 130.

FIG. 12 is a view illustrating an example of the control in the traveling direction of suction tool 110 with respect to an R-convex surface of object 130. In order to affix sticker 150 to object 130 with equal force, desirably the traveling direction of pressing portion 502 is always the normal direction with respect to the surface of object 130. Accordingly, controller 200 adjusts the traveling direction of pressing portion 502 (suction tool 110) based on the signal acquired from force sensor 201.

More specifically, controller 200 compares the measured value of the force applied to pressing portion 502 with the target value of the force applied to pressing portion 502, and determines the adjustment amount of the traveling direction of pressing portion 502 (suction tool 110) based on a difference therebetween. Furthermore, controller 200 may determine the direction in which the direction of pressing portion 502 (suction tool 110) is changed based on the direction of the force applied to pressing portion 502. Alternatively, controller 200 may correct the traveling direction of pressing portion 502 to an upward direction (a direction in which the traveling direction of pressing portion 502 is separated from the surface of object 130) when the measured value of the force applied to pressing portion 502 is larger than the target value (when pressing portion 502 is pressed against object 130 more than necessary), and controller 200 may correct the traveling direction of pressing portion 502 to a downward direction (a direction in which the traveling direction of pressing portion 502 is brought closer to the surface of object 130) when the measured value of the force applied to pressing portion 502 is smaller than the target value. Controller 200 adjusts the traveling direction of pressing portion 502 (suction tool 110) based on the determined adjustment direction and adjustment amount. Controller 200 brings the traveling direction of pressing portion 502 closer to the normal direction with respect to the surface of object 130 by repeating the above processing.

The control of the traveling direction of suction tool 110 will be described by exemplifying the case where pressing portion 502 runs on the R-convex surface and the case where pressing portion 502 gets over the R-convex surface.

A scene A illustrates a state in which pressing portion 502 has reached a position where pressing portion 502 runs on the R-convex surface of object 130. In scene A, a traveling direction 1301 of pressing portion 502 is on an inner side of a normal direction 1310 with respect to the surface of object 130 (on the side of object 130 as viewed from the normal). In this case, reaction force received by pressing portion 502 from object 130 becomes resistance force against the traveling direction of pressing portion 502. As a result, pressing portion 502 presses sticker 150 against object 130 with stronger force than expected. Accordingly, controller 200 adjusts the traveling direction of pressing portion 502 (suction tool 110) to the outside (the opposite side of object 130 as viewed from the normal) based on the signal acquired from force sensor 201.

A scene B illustrates a state after pressing portion 502 gets over the highest point of the R-convex surface of object 130. In scene B, traveling direction 1301 of pressing portion 502 becomes the outside (the opposite side of object 130 as viewed from the normal) of normal direction 1310 with respect to the surface of object 130. In this case, pressing portion 502 presses sticker 150 against object 130 with a weaker force than assumed. Therefore, controller 200 adjusts the traveling direction of pressing portion 502 (suction tool 110) to the inside (the side of object 130 as viewed from the normal) based on the signal acquired from force sensor 201.

Figure 13:
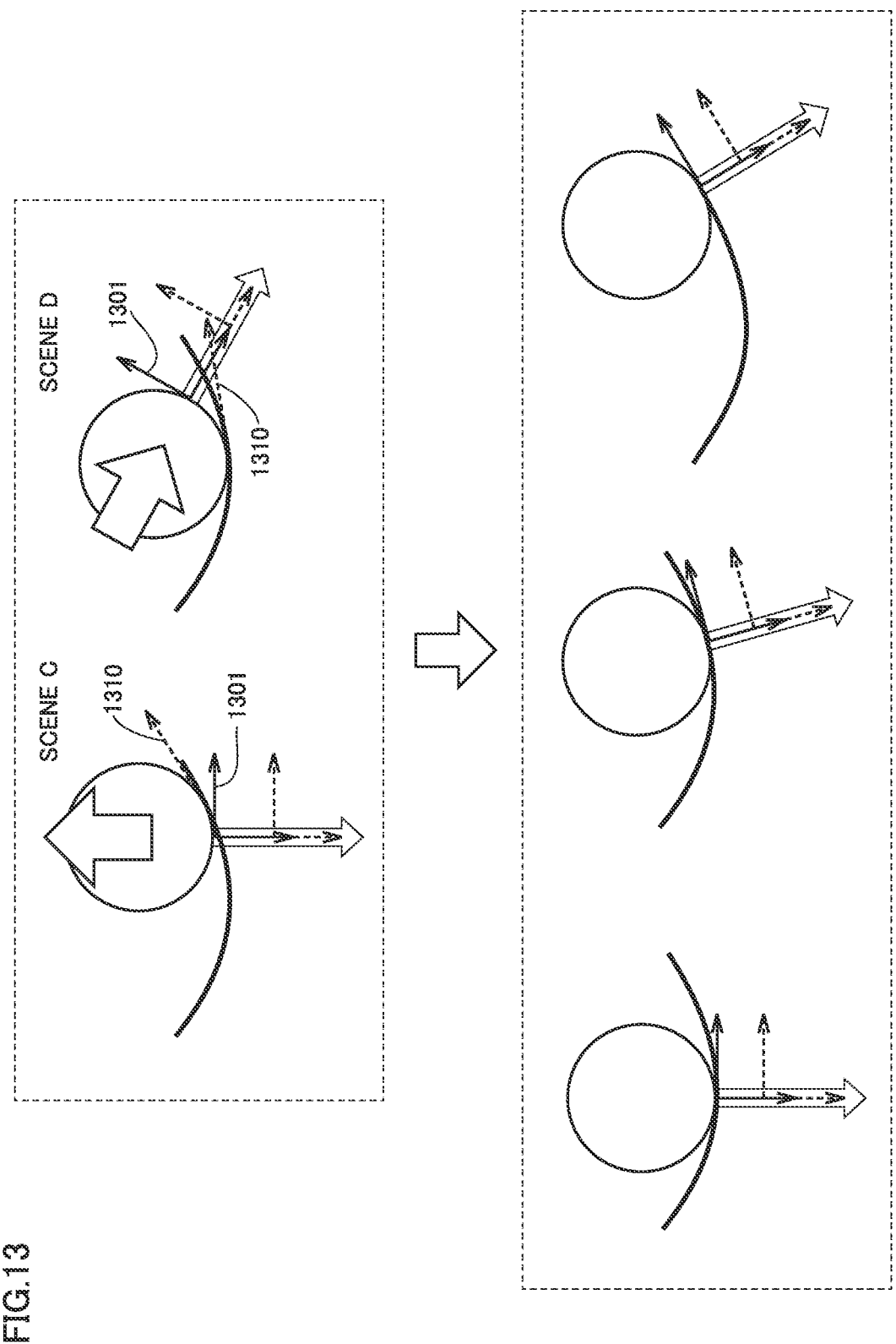
FIG. 13 is a view illustrating an example of the control in the traveling direction of the suction tool 110 with respect to an R-concave surface of the object 130.

FIG. 13 is a view illustrating an example of the control in the traveling direction of suction tool 110 with respect to the R-concave surface of object 130. Also on the R-concave surface of object 130, controller 200 can adjust the traveling direction of pressing portion 502 (suction tool 110) by a procedure similar to the procedure described with reference to FIG. 12.

In a scene C, traveling direction 1301 of pressing portion 502 is on the inside (on the side of object 130 as viewed from the normal) of normal direction 1310 with respect to the surface of object 130. In this case, the traveling direction of pressing portion 502 (suction tool 110) is adjusted to the outside (the opposite side of object 130 as viewed from the normal) based on the signal acquired from force sensor 201.

In a scene D, traveling direction 1301 of pressing portion 502 is on the outside (the opposite side of object 130 as viewed from the normal) of normal direction 1310 with respect to the surface of object 130. In this case, the traveling direction of pressing portion 502 (suction tool 110) is adjusted to the inside (the side of object 130 as viewed from the normal line) based on the signal acquired from force sensor 201.

Figure 14:
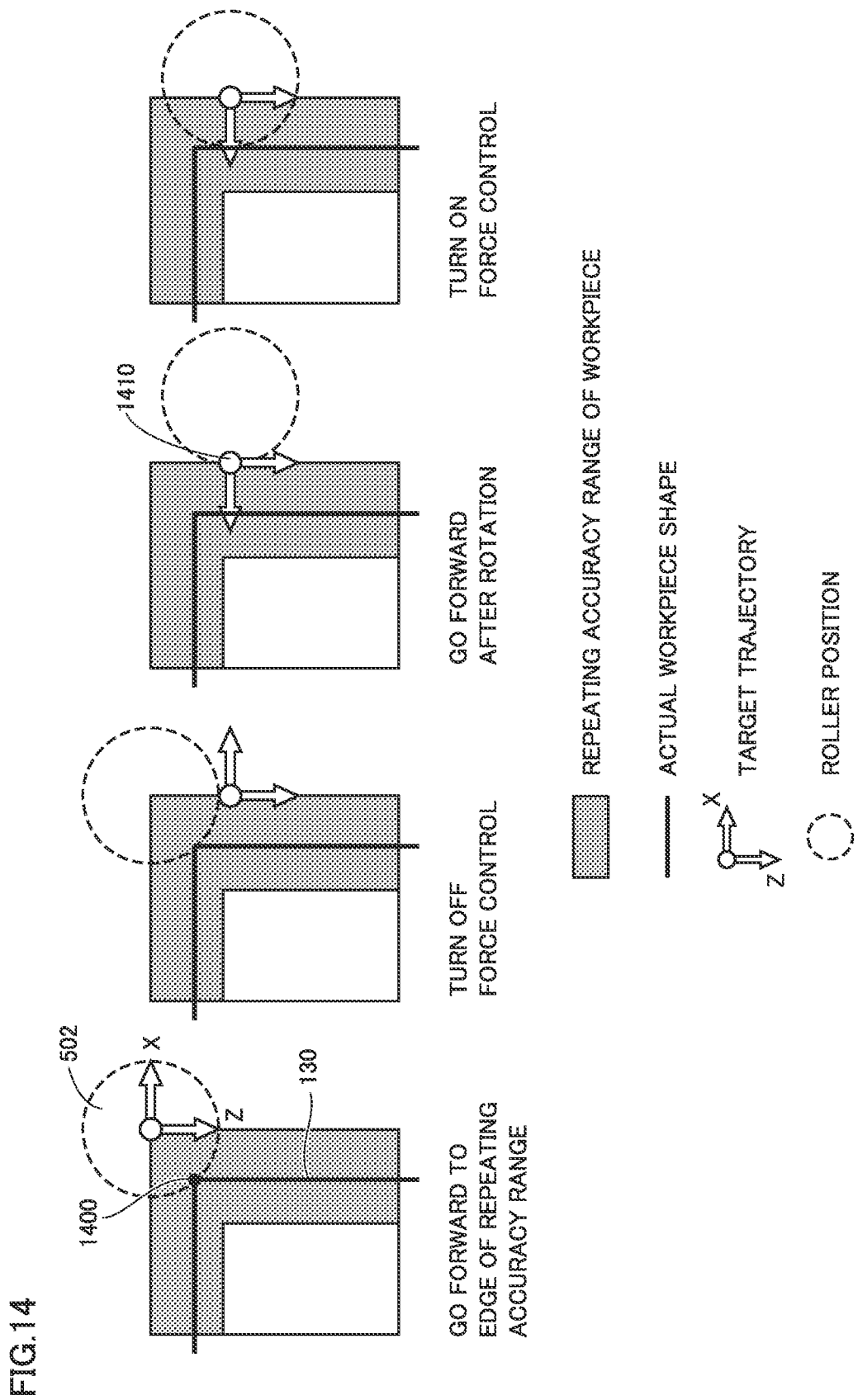
FIG. 14 is a view illustrating an example of the control in the traveling direction of the suction tool 110 at a corner of the object 130.

FIG. 14 is a view illustrating an example of the control in the traveling direction of suction tool 110 at the corner of object 130. When the surface to which sticker 150 is affixed includes the corner, sometimes sticker 150 cannot be affixed to object 130 without the wrinkle only by feedback by force sensor 201. This is because force sensor 201 does not detect the stress when pressing portion 502 exceeds the corner of object 130, controller 200 cannot accurately adjust the traveling direction of suction portion 501 (suction tool 110) based on the signal of force sensor 201. For this reason, sticker affixing system 10 executes position control (control of the traveling direction of suction portion 501 (suction tool 110) based on the position of pressing portion 502) instead of the force sense control (control of the traveling direction of suction portion 501 (suction tool 110) based on the signal of force sensor 201) at the corner of object 130.

More specifically, when pressing portion 502 (suction tool 110) reaches a predetermined first position 1400, controller 200 stops the posture control of suction tool 110 using force sensor 201. Subsequently, controller 200 controls the posture and the traveling direction of suction tool 110 based on the position of suction tool 110. In the example of FIG. 14, controller 200 changes the direction of pressing portion 502 (suction tool 110) along the corner. When suction tool 110 reaches a predetermined second position 1410, controller 200 resumes the posture control of suction tool 110 using force sensor 201.

First position 1400 may be a vertex of the corner or a position slightly past the corner (near the corner). Second position 1410 is a position where force sensor 201 can detect the stress from object 130.

Controller 200 previously registers first position 1400 and second position 1410 in storage 603 as an input setting or teaching result from the user. Since controller 200 transmits the instruction including the target position of suction tool 110 to articulated robot 100, controller 200 always holds information about the current position of suction tool 110.

As another example, controller 200 may temporarily ignore the signal from force sensor 201 when suction tool 110 reaches predetermined first position 1400. In this case, controller 200 causes articulated robot 100 to move suction tool 110 along the shape (corner) of object 130 based on the position of suction tool 110. When suction tool 110 reaches predetermined second position 1410, controller 200 resumes the acquisition of the signal from force sensor 201 and causes articulated robot 100 to move suction tool 110 along the shape (the surface after passing through the corner) of object 130 based on the signal from force sensor 201.

As described above, sticker affixing system 10 stops the affixing processing using force sensor 201 at the corner of object 130, and performs the affixing processing using the position information about suction tool 110 instead. Thus, the affixing of sticker 150 to the corner of object 130 can be implemented, which is difficult only by the control by force sensor 201.

D. Internal Processing of Sticker Affixing System

Figure 15:
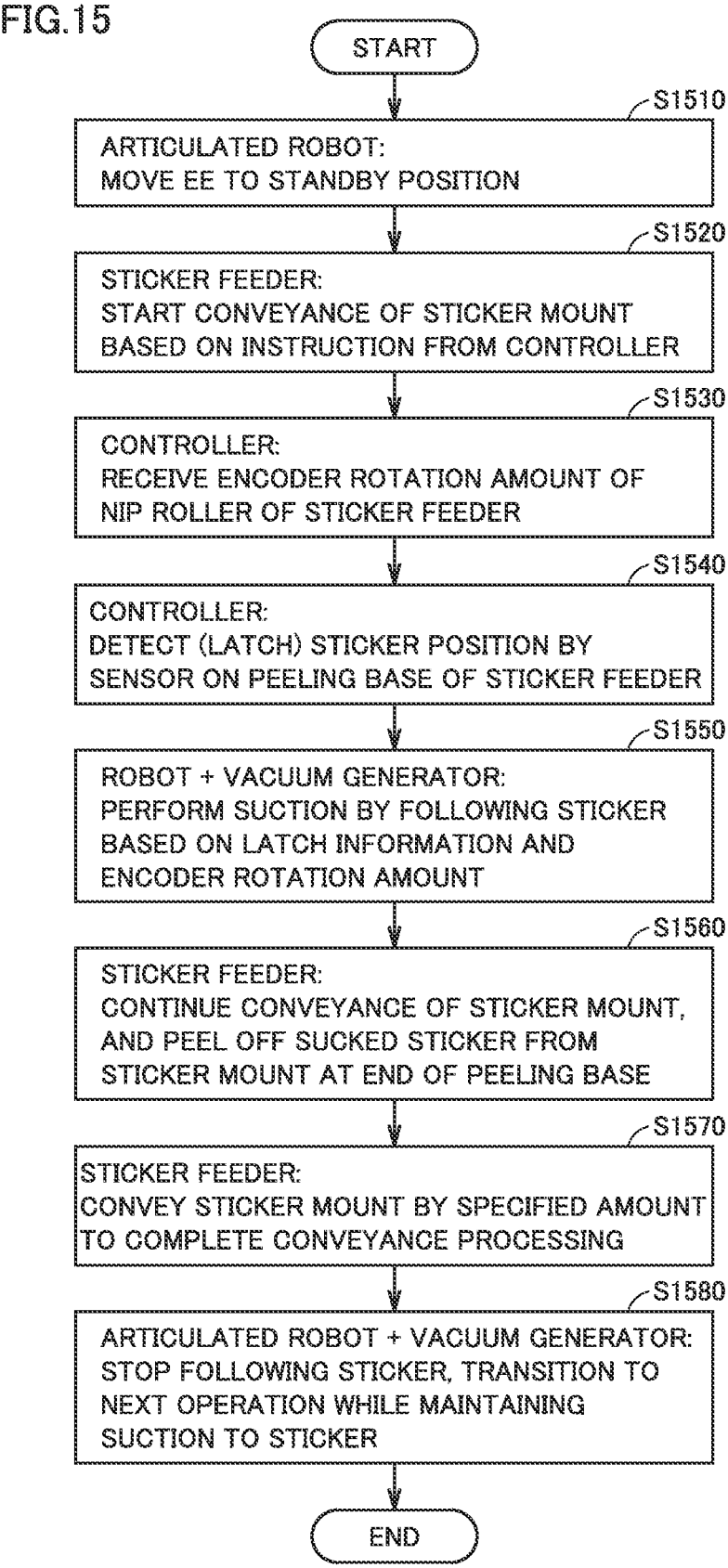
FIG. 15 is a view illustrating an example of a processing procedure for peeling off the sticker 150 from the release paper 300 in the sticker affixing system 10.

FIG. 15 is a view illustrating an example of the processing procedure for peeling off sticker 150 from release paper 300 in sticker affixing system 10. In one aspect, processor 601 may read the program performing the processing in FIG. 15 from storage 603 to memory 602 and execute the program. In another aspect, a part or all of the processing can be implemented as a combination of circuit elements configured to execute the processing. In one aspect, the order of the pieces of processing from step S1510 to step S1580 may be changed as necessary.

In step S1510, articulated robot 100 moves the end effector (suction tool 110) to the standby position. The processing in this step corresponds to the processing in step 1 in FIG. 8. More specifically, controller 200 transmits the instruction including the target position (standby position) of suction tool 110 to articulated robot 100. Articulated robot 100 changes the posture of each joint based on the received command, and moves suction tool 110 to the standby position.

In step S1520, sticker feeder 120 starts the conveyance of release paper 300 based on the instruction from controller 200. The processing of this step may be executed simultaneously with the processing of step S1510, or executed before the processing of step S1510.

In step S1530, controller 200 receives the rotation amount of encoder 720 of a nip roller of sticker feeder 120. For example, the nip roller is a roller that sandwiches release paper 300 adjacent to first winding shaft 223, second winding shaft 224, or any roller on the conveyance path of release paper 300, and rotates according to the rotation of the adjacent roller. In one aspect, encoder 720 may be provided on first winding shaft 223, second winding shaft 224, or any roller on the conveyance path of release paper 300.

In step S1540, controller 200 detects the position of sticker 150 using sensor 121 on peeling base 122 of sticker feeder 120. More specifically, controller 200 detects the timing at which sticker 150 passes immediately below sensor 121 (reference position calculating the current position of sticker 150).

In step S1550, articulated robot 100 causes suction tool 110 to follow sticker 150 based on latch information (information about sensor 121) and the encoder rotation amount. More specifically, controller 200 determines the target position and the arrival time of suction tool 110 based on the latch information (information about sensor 121) and the encoder rotation amount. Controller 200 transmits the instruction including the target position and the arrival time of suction tool 110 to articulated robot 100. Articulated robot 100 moves suction tool 110 based on the received instruction. At this time, vacuum generator 204 discharges the compressed air to generate the suction force in the plurality of holes 510 of suction tool 110. Vacuum generator 204 is also controlled by controller 200. The processing in this step corresponds to the processing in step 2 in FIG. 8.

In step S1560, sticker feeder 120 continues the conveyance of release paper 300, and peels off adsorbed sticker 150 from release paper 300 at the end (edge A in FIG. 8) of peeling base 122. The processing in this step corresponds to the processing in step 3 in FIG. 8.

In step S1570, sticker feeder 120 conveys release paper 300 by a specified amount and completes the conveyance processing.

In step S1580, articulated robot 100 stops following sticker 150. Vacuum generator 204 maintains the suction to sticker 150 by suction tool 110. Articulated robot 100 proceeds to the next processing. The next processing corresponds to the processing in steps 4, 5 in FIG. 8. After completion of the processing for attaching sticker 150 to object 130, articulated robot 100 returns to step S1510 again and repeatedly executes the processing of step S1510 and subsequent steps.

As described above, sticker affixing system 10 of the embodiment has the function of operating sticker feeder 120 and articulated robot 100 in synchronization. With this function, sticker affixing system 10 can prevent the generation of wrinkle of sticker 150 in the operation of peeling off sticker 150.

In addition, sticker affixing system 10 of the embodiment includes suction tool 110 including suction portion 501 and pressing portion 502. Sticker affixing system 10 performs the processing for affixing sticker 150 to object 130 using suction tool 110, thereby preventing the generation of the bubble between sticker 150 and object 130 during the affixing operation.

In addition, sticker affixing system 10 of the embodiment can adjust the traveling direction and the posture of suction tool 110 during the processing for affixing sticker 150 based on the signal acquired from force sensor 201. This allows sticker affixing system 10 to constantly apply the uniform force to the surface of sticker 150 and further move suction tool 110 along the shape of object 130. As a result, sticker affixing system 10 can prevent the generation of the wrinkle in sticker 150 in the operation of affixing sticker 150.

In addition, sticker affixing system 10 of the embodiment can switch and use the control of suction tool 110 using force sensor 201 and the control of suction tool 110 using the position information about suction tool 110. Thus, sticker affixing system 10 can implement the processing for affixing sticker 150 to the surface including the corner, which is difficult only by controlling suction tool 110 using force sensor 201.

Furthermore, sticker affixing system 10 of the embodiment can teach the peeling position of suction tool 110 to articulated robot 100 using force sensor 201. In the teaching, sticker affixing system 10 adjusts the position of suction tool 110 in the Z-axis direction (the upward vertical direction (Z axis: yaw axis) with respect to the traveling direction (X-axis: roll axis) during the processing for peeling off suction tool 110), the Rx direction (the rotation direction with the X-axis as the rotation axis), and the Ry direction (the rotation direction with the direction (Y-axis: pitch axis) perpendicular to the X-axis on the surface of peeling base 122 as the rotation axis). Thus, sticker affixing system 10 can generate the uniform suction force on the surface of sticker 150 in the peeling operation, and peel off sticker 150 from release paper 300 without making the wrinkle in sticker 150.

E. Appendix

As described above, the embodiment includes the following disclosure.

[Configuration 1]

A sticker affixing system (10) including:
an articulated robot (100);
a controller (200) configured to control the articulated robot (100);
a suction tool (110) attached to a distal end of the articulated robot (100);
a force sensor (201) configured to detect force applied to the suction tool (110); and
a storage (603) configured to store teaching data of the articulated robot (100),
in which the controller (200) causes the articulated robot (100) to execute:
an operation of bringing the suction tool (110) close to a sticker (150) on a release paper (300) in a teaching mode;
an operation of adjusting a suction position of the suction tool (110) and an inclination in a traveling direction (roll axis (X)) of the suction tool (110) in peeling off the sticker (150) based on a signal from the force sensor (201); and
an operation of storing the teaching data including information about the adjusted suction position and inclination of the suction tool (110) in the storage (603).

[Configuration 2]

The sticker affixing system (10) described in configuration 1, in which the controller (200):
acquires a measured value of moment of the roll axis (X) of the suction tool (110) from the force sensor (201);
calculates a difference between the measured value of the moment of the roll axis (X) and a target value of the moment of the roll axis (X); and
determines an adjustment amount of the inclination in the suction tool (110) on the roll axis (X) based on the difference.

[Configuration 3]

The sticker affixing system (10) described in configuration 1 or 2, in which the controller (200) further causes the articulated robot (100) to execute an operation of adjusting an inclination of a pitch axis (Y) with respect to the traveling direction of the suction tool (110) based on the signal from the force sensor (201).

[Configuration 4]

The sticker affixing system (10) described in configuration 3, in which the controller (200):
- acquires a measured value of moment on the pitch axis (Y) of the suction tool (110) from the force sensor (201);
- calculates a difference between the measured value of the moment on the pitch axis (Y) and a target value of the moment on the pitch axis (Y); and
- determines an adjustment amount of the inclination in the pitch axis (Y) of the suction tool (110) based on the difference.

[Configuration 5]

The sticker affixing system (10) described in any one of configurations 1 to 4, in which the controller (200) stores a position separated from the adjusted suction position by a predetermined distance above the release paper (300) in the storage (603) as a start position of a sticker (150) peeling operation in the suction tool (110).

[Configuration 6]

A method for controlling a sticker affixing system (10), the sticker affixing system (10) including:
- an articulated robot (100);
- a controller (200) configured to control the articulated robot (100);
- a suction tool (110) attached to a distal end of the articulated robot (100);
- a force sensor (201) configured to detect force applied to the suction tool (110); and
- a storage (603) configured to store teaching data of the articulated robot (100), the method including:
- bringing the suction tool (110) close to a sticker (150) on a release paper (300) in a teaching mode;
- adjusting a suction position of the suction tool (110) and an inclination of a roll axis (X) with respect to a traveling direction of the suction tool (110) in peeling off the sticker (150) based on the signal from the force sensor (201); and
- storing the teaching data including information about the adjusted suction position and the inclination of the roll axis (X) in the storage (603).

[Configuration 7]

A program for controlling a sticker affixing system (10), the sticker affixing system (10) including:
- an articulated robot (100);
- a controller (200) configured to control the articulated robot (100);
- a suction tool (110) attached to a distal end of the articulated robot (100);
- a force sensor (201) configured to detect force applied to the suction tool (110); and
- a storage (603) configured to store teaching data of the articulated robot (100), the program causing the sticker affixing system (10) to execute:
- bringing the suction tool (110) close to a sticker (150) on a release paper (300) in a teaching mode;
- adjusting a suction position of the suction tool (110) and an inclination of a roll axis (X) with respect to a traveling direction of the suction tool (110) in peeling off the sticker (150) based on the signal from the force sensor (201); and
- storing the teaching data including information about the adjusted suction position and the inclination of the roll axis (X) in the storage (603).

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A sticker affixing system comprising:
   an articulated robot;
   a controller configured to control the articulated robot;
   a suction tool attached to a distal end of the articulated robot;
   a force sensor configured to detect force applied to the suction tool; and
   a storage configured to store teaching data of the articulated robot,
   wherein the controller causes the articulated robot to execute:
   an operation of bringing the suction tool close to a sticker on a release paper in a teaching mode;
   an operation of adjusting a suction position of the suction tool and an inclination of a roll axis with respect to a traveling direction of the suction tool in peeling off the sticker based on a signal from the force sensor; and
   an operation of storing the teaching data including information about the adjusted suction position and inclination of the suction tool in the storage.

2. The sticker affixing system according to claim 1, wherein the controller:
   acquires a measured value of moment of the roll axis of the suction tool from the force sensor;
   calculates a difference between the measured value of the moment of the roll axis and a target value of the moment of the roll axis; and
   determines an adjustment amount of the inclination in the suction tool on the roll axis based on the difference.

3. The sticker affixing system according to claim 1, wherein the controller further causes the articulated robot to execute an operation of adjusting an inclination of a pitch axis with respect to the traveling direction of the suction tool based on the signal from the force sensor.

4. The sticker affixing system according to claim 3, wherein the controller:
   acquires a measured value of moment on the pitch axis of the suction tool from the force sensor;
   calculates a difference between the measured value of the moment on the pitch axis and a target value of the moment on the pitch axis; and
   determines an adjustment amount of the inclination in the pitch axis of the suction tool based on the difference.

5. The sticker affixing system according to claim 1, wherein the controller stores a position separated from the adjusted suction position by a predetermined distance above the release paper in the storage as a start position of a sticker peeling operation in the suction tool.

6. A method for controlling a sticker affixing system, the sticker affixing system including:
   an articulated robot;
   a controller configured to control the articulated robot;
   a suction tool attached to a distal end of the articulated robot;
   a force sensor configured to detect force applied to the suction tool; and
   a storage configured to store teaching data of the articulated robot,
   the method comprising:
   bringing the suction tool close to a sticker on a release paper in a teaching mode;

adjusting a suction position of the suction tool and an inclination of a roll axis with respect to a traveling direction of the suction tool in peeling off the sticker based on a signal from the force sensor; and storing the teaching data including information about the adjusted suction position and the inclination on the roll axis in the storage.

7. The method according to claim 6, further comprising:

acquiring a measured value of moment of the roll axis of the suction tool from the force sensor;

calculating a difference between the measured value of the moment of the roll axis and a target value of the moment of the roll axis; and determining an adjustment amount of the inclination in the roll axis of the suction tool based on the difference.

8. The method according to claim 6, further comprising causing the articulated robot to execute an operation of adjusting an inclination of a pitch axis with respect to a traveling direction of the suction tool based on the signal from the force sensor.

9. The method according to claim 8, further comprising:

acquiring a measured value of moment on a pitch axis of the suction tool from the force sensor;

calculating a difference between the measured value of the moment on the pitch axis and a target value of the moment on the pitch axis; and determining an adjustment amount of the inclination in the pitch axis of the suction tool based on the difference.

10. The method according to claim 6, further comprising storing a position separated from the adjusted suction position by a predetermined distance above the release paper in the storage as a start position of a sticker peeling operation in the suction tool.

11. A non-transitory computer-readable medium storing a program for controlling a sticker affixing system, the sticker affixing system including:
an articulated robot;
a controller configured to control the articulated robot;
a suction tool attached to a distal end of the articulated robot;
a force sensor configured to detect force applied to the suction tool; and
a storage configured to store teaching data of the articulated robot, the program causing the sticker affixing system to execute:

bringing the suction tool close to a sticker on a release paper in a teaching mode;

adjusting a suction position of the suction tool and an inclination of a roll axis with respect to a traveling direction of the suction tool in peeling off the sticker based on the signal from the force sensor; and storing the teaching data including information about the adjusted suction position and the inclination of the roll axis in the storage.

12. The non-transitory computer-readable medium according to claim 11, wherein the program further causes the sticker affixing system to execute:

acquiring a measured value of moment of the roll axis of the suction tool from the force sensor;

calculating a difference between the measured value of the moment of the roll axis and a target value of the moment of the roll axis; and determining an adjustment amount of the inclination in the roll axis of the suction tool based on the difference.

13. The non-transitory computer-readable medium according to claim 11, wherein the program further causes the sticker affixing system to further execute an operation of adjusting an inclination of a pitch axis with respect to the traveling direction of the suction tool based on the signal from the force sensor using the articulated robot.

14. The non-transitory computer-readable medium according to claim 13, wherein the program further causes the sticker affixing system to execute:

acquiring a measured value of moment on a pitch axis of the suction tool from the force sensor; and calculating a difference between the measured value of the moment on the pitch axis and a target value of the moment on the pitch axis; and determining an adjustment amount of the inclination in the pitch axis of the suction tool based on the difference.

15. The non-transitory computer-readable medium according to claim 11, wherein the program further causes the sticker affixing system to execute storing a position separated from the adjusted suction position by a predetermined distance above the release paper in the storage as a start position of a sticker peeling operation in the suction tool.

* * * * *